(12) United States Patent
Eggers et al.

(10) Patent No.: US 7,490,218 B2
(45) Date of Patent: Feb. 10, 2009

(54) BUILDING A WAVECACHE

(75) Inventors: Susan Jane Eggers, Seattle, WA (US); Martha Allen Mercaldi, Seattle, WA (US); Kenneth Alan Michelson, New York, NY (US); Mark Henry Oskin, Seattle, WA (US); Andrew Kinoshita Petersen, Seattle, WA (US); Andrew Richard Putnam, Seattle, WA (US); Andrew Michalski Schwerin, Seattle, WA (US); Steven James Swanson, Seattle, WA (US)

(73) Assignee: University of Washington, Seattle, WA (US)

( * ) Notice: Subject to any disclaimer, the term of this patent is extended or adjusted under 35 U.S.C. 154(b) by 132 days.

(21) Appl. No.: 11/284,760

(22) Filed: Nov. 22, 2005

(65) Prior Publication Data

US 2006/0179429 A1      Aug. 10, 2006

Related U.S. Application Data

(63) Continuation-in-part of application No. 11/041,396, filed on Jan. 21, 2005.

(60) Provisional application No. 60/630,765, filed on Nov. 24, 2004, provisional application No. 60/538,603, filed on Jan. 22, 2004.

(51) Int. Cl.
  *G06F 15/00* (2006.01)
  *G06F 15/76* (2006.01)
(52) U.S. Cl. ........................................ 712/25
(58) Field of Classification Search ............... 712/25
  See application file for complete search history.

(56) References Cited

U.S. PATENT DOCUMENTS

| 4,873,626 | A | 10/1989 | Gifford ........................ 710/120 |
| 5,253,308 | A | 10/1993 | Johnson ........................ 382/304 |
| 5,745,725 | A | 4/1998 | Simpson ........................ 712/214 |
| 5,913,925 | A | 6/1999 | Kahle et al. ................... 712/206 |
| 5,961,639 | A | 10/1999 | Mallick et al. ............... 712/242 |
| 6,182,210 | B1 * | 1/2001 | Akkary et al. ............... 712/235 |

(Continued)

OTHER PUBLICATIONS

Black et al.; The Block-based Trace Cache; 1999; IEEE Computer Society; International Symposium on Computer Architecture '99; pp. 196-207.*

(Continued)

*Primary Examiner*—Eddie P Chan
*Assistant Examiner*—Corey S Faherty
(74) *Attorney, Agent, or Firm*—Ronald M. Anderson

(57) ABSTRACT

A microarchitecture and instruction set that supports multiple, simultaneously executing threads. The approach is disclosed in regard to its applicability in connection with a recently developed microarchitecture called "WaveScalar." WaveScalar is a compiler that breaks a control flow graph for a program into pieces called waves having instructions that are partially ordered (i.e., a wave contains no back-edges), and for which control enters at a single point. Certain aspects of the present approach are also generally applicable to executing multiple threads on a more conventional microarchitecture. In one aspect of this approach, instructions are provided that enable and disable wave-ordered memory. Additional memory access instructions bypass wave-ordered memory, exposing additional parallelism. Also, a lightweight, interthread synchronization is employed that models hardware queue locks. Finally, a simple fence instruction is used to allow applications to handle relaxed memory consistency.

25 Claims, 26 Drawing Sheets

U.S. PATENT DOCUMENTS

| | | | | |
|---|---|---|---|---|
| 6,212,542 | B1 | 4/2001 | Kahle et al. | 718/102 |
| 6,223,338 | B1* | 4/2001 | Smolders | 717/128 |
| 6,286,095 | B1* | 9/2001 | Morris et al. | 712/216 |
| 6,327,607 | B1 | 12/2001 | Fant | 709/201 |
| 6,470,443 | B1* | 10/2002 | Emer et al. | 712/205 |
| 6,530,079 | B1* | 3/2003 | Choi et al. | 717/158 |
| 6,606,702 | B1* | 8/2003 | Guthrie et al. | 712/218 |
| 6,708,269 | B1* | 3/2004 | Tiruvallur et al. | 712/225 |
| 6,735,760 | B1* | 5/2004 | Dice | 717/139 |
| 6,986,131 | B2 | 1/2006 | Thompson et al. | 717/160 |
| 6,988,183 | B1 | 1/2006 | Wong | 712/208 |
| 2003/0126186 | A1* | 7/2003 | Rodgers et al. | 709/107 |

OTHER PUBLICATIONS

Connors et al.; Compiler-Directed Dynamic Computation Reuse: Rationale and Initial Results; 1999; IEEE Computer Society; International Symposium on Microarchitecture '99; pp. 158-169.*

Gharachorloo et al.; Memory Consistency and Event Ordering in Scalable Shared-Memory Multiprocessors; 1990; ACM Press; International Symposium on ComputerArchitecture '90; pp. 15-26.*

Shen et al.; Modern Processor Design: Fundamentals of Superscalar Processors; Jul. 2002; McGraw-Hill; Beta Edition; pp. 442,446-447,450.*

Fu et al.; Value Speculation Scheduling for High Performance Processors; 1998.*

Gallagher et al.; Dynamic Memory Disambiguation Using the Memory Conflict Buffer; 1994; ASPLOS-VI.*

Fang et al.; Automatic fence insertion for shared memory multiprocessing; ICS '03; 2003.*

T. M. Austin. DIVA: A Reliable Substrate for Deep Submicron Microarchitecture Design, In *Proceedings of the 32$^{nd}$ International Symposium on Microarchitecture*; Nov. 1999. 12pp.

K. Mai, et al., "Smart Memories: A Modular Reconfigurable Architecture." *International Symposium on Computer Architecture*, 2002. 11 pp.

R. Nagarajan et al. "A Design Space Evaluation of Grid Processor Architectures." *International Symposium on Microarchitecture*, 2001. pp. 1-12.

E. Rotenberg. "AR-SMT: A Microarchitectural Approach to Fault Tolerance in Microprocessors." Computer Sciences Department, University of Wisconsin-Madison. (ericro@cs.wisc.edu). 8pp.

E. Waingold, et al. "Baring It All to Software: Raw Machines." *IEEE Computer*. Sep. 1997. pp. 86-93.

Swanson et al., "WaveScalar," Dec. 2003, Proceedings of the 36$^{th}$ International Symposium on Microarchitecture.

Swanson et al., "WaveScalar," Jan. 2003, Technical Report, Department of Computer Science and Engineering, University of Washington.

Modern Processor Design Fundamentals of Superscalar Processors, John Paul Shen et al., BETA Edition, Oct. 9, 2002, Whole Manual.

* cited by examiner

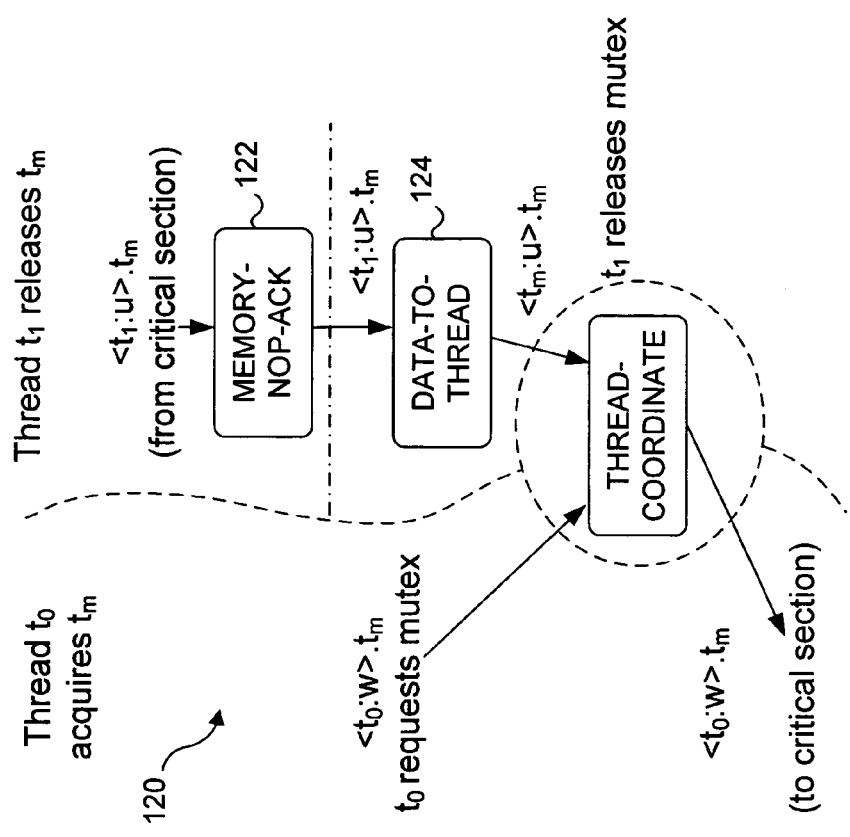
*FIG. 7*
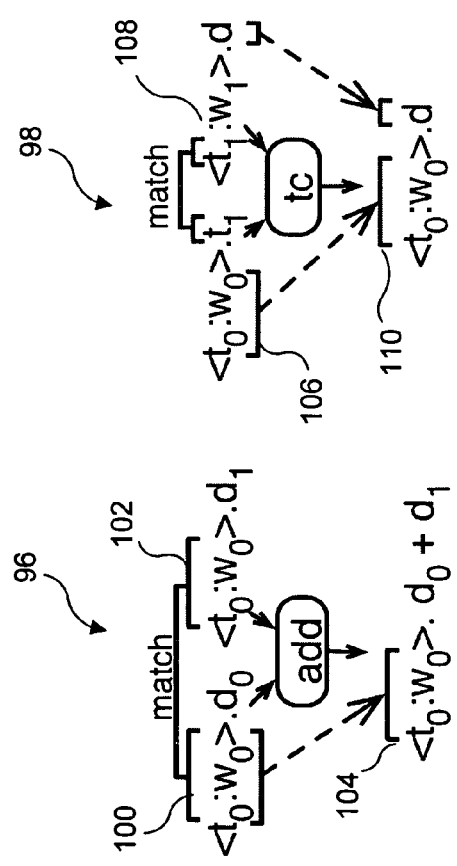
*FIG. 6B*
*FIG. 6A*

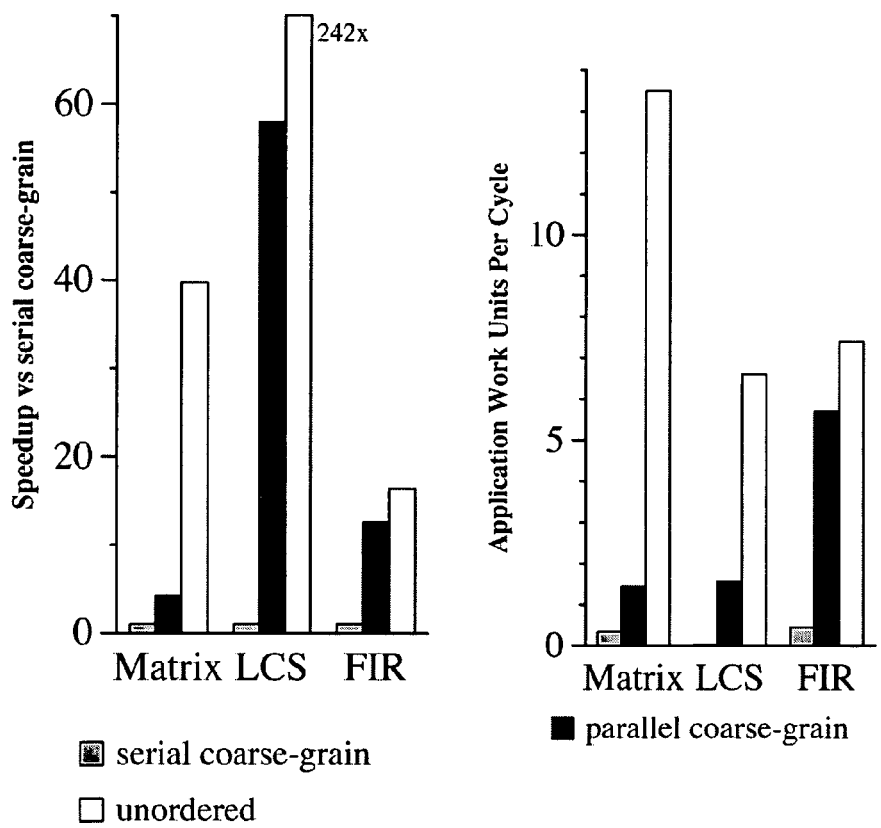
■ serial coarse-grain
■ parallel coarse-grain
□ unordered
FIG. 10     FIG. 11
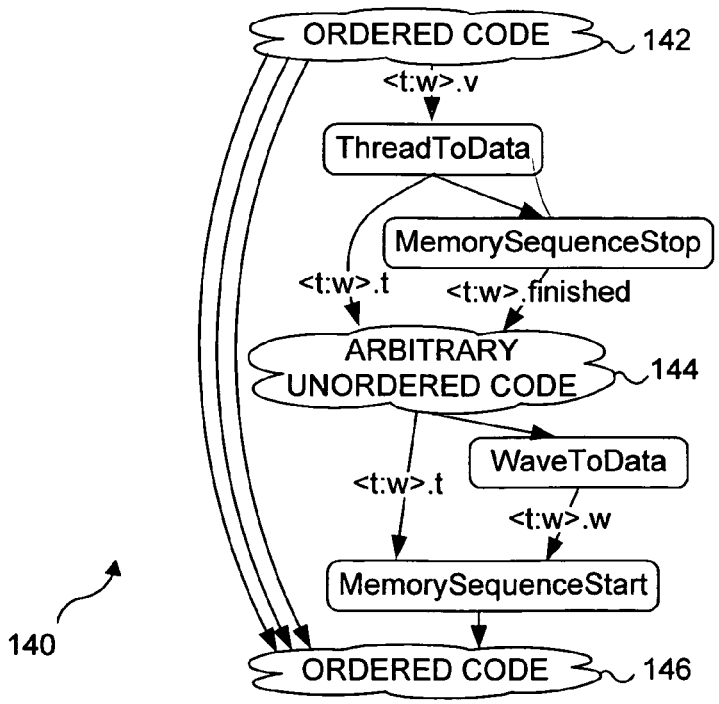
FIG. 12

BUILDING A WAVECACHE

RELATED APPLICATIONS

This application is a continuation-in-part of copending patent application Ser. No. 11/041,396, filed on Jan. 21, 2005, which itself is based on prior provisional application, Ser. No. 60/630,765, filed on Nov. 24, 2004, and prior provisional application, Ser. No. 60/538,603, filed on Jan. 22, 2004, the benefit of the filing date of which is hereby claimed under 35 U.S.C. § 120 and 35 U.S.C. § 119.

GOVERNMENT RIGHTS

This invention was funded at least in part with grants (No. CCR03-25635 and No. CCF01-33188) from the National Science Foundation, and the U.S. government may have certain rights in this invention.

BACKGROUND

It is widely accepted that Moore's Law growth in available transistors will continue for the next decade. Recent research, however, has demonstrated that simply scaling up current architectures will not convert these new transistors to commensurate increases in performance. This gap between the performance improvements that are needed and those that can be realized by simply constructing larger versions of existing architectures will fundamentally alter processor designs.

Three problems contribute to this gap, creating a processor scaling wall. The problems include the ever-increasing disparity between computation and communication performance—fast transistors, but slow wires; the increasing cost of circuit complexity, leading to longer design times, schedule slips, and more processor bugs; and the decreasing reliability of circuit technology, caused by shrinking feature sizes and continued scaling of the underlying material characteristics. In particular, modern superscalar processor designs will not scale, because they are built atop a vast infrastructure of slow broadcast networks, associative searches, complex control logic, and inherently centralized structures that must all be designed correctly for reliable execution. Like the memory wall, the processor scaling wall has motivated a number of research efforts. These efforts all augment the existing program counter-driven von Neumann model of computation by providing redundant checking mechanisms (see for example, the work by T. M. Austin, "DIVA: A reliable substrate for deep submicron microarchitecture design," *International Symposium on Microarchitecture*, 1999); exploiting compiler technology for limited dataflow-like execution, as disclosed by R. Nagarajan et al., "A design space evaluation of grid processor architectures," *International Symposium on Microarchitecture*, 2001; or efficiently exploiting coarse grained parallelism, as proposed by K. Mai et al., "Smart memories: A modular reconfigurable architecture," *International Symposium on Computer Architecture*, 2002, or as disclosed by E. Waingold et al., "Baring it all to software: Raw machines," *IEEE Computer*, vol. 30, no. 9, 1997.

A Case for Exploring Superscalar Alternatives

The von Neumann model of execution and its most sophisticated implementations, out-of-order superscalars, have been a phenomenal success. However, superscalars suffer from several drawbacks that are beginning to emerge. First, their inherent complexity makes efficient implementation a daunting challenge. Second, they ignore an important source of locality in instruction streams; and third, their execution model centers around instruction fetch, an intrinsic serialization point.

As features and cycle times shrink, the hardware structures that form the core of superscalar processors (register files, issue windows, and scheduling logic) become extremely expensive to access. Consequently, clock speed decreases and/or pipeline depth increases. Indeed, industry recognizes that building ever-larger superscalars as transistor budgets expand can be impractical, because of the processor scaling wall. Many manufacturers are turning to larger caches and chip multiprocessors to convert additional transistors into increased performance without impacting cycle time.

To squeeze maximum performance from each core, architects constantly add new algorithms and structures to designs. Each new mechanism, optimization, or predictor adds additional complexity and makes verification time an ever increasing cost in processor design. Verification already consumes about 40% of project resources on complex designs, and verification costs are increasing.

Untapped Locality

Superscalars devote a large share of their hardware and complexity to exploiting locality and predictability in program behavior. However, they fail to utilize a significant source of locality intrinsic to applications, i.e., dataflow locality. Dataflow locality is the predictability of instruction dependencies through the dynamic trace of an application. A processor could take advantage of this predictability to reduce the complexity of its communication system (i.e., register files and bypass networks) and reduce communication costs.

Dataflow locality exists, because data communication patterns among static instructions are predictable. There are two independent, but complimentary, types of dataflow locality—static and dynamic. Static dataflow locality exists, because, in the absence of control, the producers and consumers of register values are precisely known. Within a basic block and between basic blocks that are not control dependent (e.g., the basic blocks before and after an If-Then-Else) the data communication patterns are completely static and, therefore, completely predictable. Dynamic dataflow locality arises from branch predictability. If a branch is highly predictable and almost always taken, for instance, then the static instructions before the branch frequently communicate with instructions on the taken path and rarely communicate with instructions on the not-taken path.

The vast majority of operand communication is highly predictable. Such high rates of predictability suggest that current processor communication systems are over-general, because they provide instructions with fast access to many more register values than needed. If the processor could exploit dataflow locality to ensure that necessary inputs were usually close at hand (at the expense of other potential inputs being farther away), they could reduce the average cost of communication.

Instead of simply ignoring dataflow locality, however, superscalars destroy it in their search for parallelism. Register renaming removes false dependencies, enables dynamic loop unrolling, and exposes a large amount of dynamic instruction level parallelism (ILP) for the superscalar core to exploit. However, it destroys dataflow locality. By changing the physical registers and instruction uses, renaming forces the architecture to provide each instruction with fast access to the entire physical register file, which results in a huge, slow register file and complicated forwarding networks.

Destroying dataflow locality leads to inefficiencies in modern processor designs: The processor fetches a stream of instructions with a highly predictable communication pattern, destroys that predictability by renaming, and then compensates by using broadcast communication in the register file and the bypass network, combined with complex scheduling in the instruction queue. The consequence is that modern processor designs devote few resources to actual execution (less than 10%, as measured on an Intel Corporation Pentium III™ die photo) and the vast majority to communication infrastructure.

Several industrial designs, such as partitioned superscalars like the Alpha 21264, some very long instruction word (VLIW) machines, and several research designs have addressed this problem with clustering or other techniques, and exploit dataflow locality to a limited degree. But none of these approaches make full use of it, because they still include large forwarding networks and register files. Accordingly, it would be desirable to provide an execution model and architecture built expressly to exploit the temporal, spatial, and dataflow locality that exists in instruction and data streams.

The Von Neumann Model: Serial Computing

The von Neumann model of computation is very simple. It has three key components: a program stored in memory, a global memory for data storage, and a program counter that guides execution through the stored program. At each step, the processor loads the instruction at the program counter, executes it (possibly updating main memory), and updates the program counter to point to the next instruction (possibly subject to branch instructions).

Two serialization points constrain the von Neumann model and, therefore, superscalar processors. The first arises as the processor, guided by the program counter and control instructions, assembles a linear sequence of operations for execution. The second serialization point is at the memory interface where memory operations must complete (or appear to complete) in order to guarantee load-store ordering. The elegance and simplicity of the model are striking, but the price is steep. Instruction fetch introduces a control dependence between each instruction and the next and serves little purpose besides providing the ordering to which the memory interface must adhere. As a result, von Neumann processors are fundamentally sequential.

In practice, of course, von Neumann processors do achieve limited parallelism (i.e., instructions per cycle (IPC) greater than one), by using several methods. The explicitly parallel instructions sets for VLIW and vector machines enable the compiler to express instruction and data independence statically. Superscalars dynamically examine many instructions in the execution stream simultaneously, violating the sequential ordering when they determine it is safe to do so. In addition, recent work introduces limited amounts of parallelism into the fetch stage by providing multiple fetch and decode units.

It has been demonstrated that ample ILP exists within applications, but that the control dependencies that sequential fetch introduces constrain this ILP. Despite tremendous effort over decades of computer architecture research, no processor comes close to exploiting the maximum ILP present in applications, as measured in limit studies. Several factors account for this result, including the memory wall and necessarily finite execution resources, but control dependence and, by extension, the inherently sequential nature of von Neumann execution, remain dominant factors. Accordingly, a new approach is needed to overcome the limitations of the von Neumann model.

WaveScalar—A New Approach

An alternative to superscalar architecture that has been developed is referred to herein by the term "WaveScalar." WaveScalar is a datafrow architecture. Unlike past dataflow work, which focused on maximizing processor utilization, WaveScalar seeks to minimize communication costs by avoiding long wires and broadcast networks. To this end, it includes a completely decentralized implementation of the "token-store" of traditional dataflow architectures and a distributed execution model. Commonly assigned U.S. patent application, Ser. No. 11/041,396, which is entitled "WAVESCALAR ARCHITECTURE HAVING A WAVE ORDER MEMORY," describes details of this dataflow architecture, and the drawings and specification of this application are hereby specifically incorporated herein by reference.

The key difference between WaveScalar and prior art dataflow architectures is that WaveScalar efficiently supports traditional von Neumann-style memory semantics in a dataflow model. Previously, dataflow architectures provided their own style of memory semantics and their own dataflow languages that disallowed side effects, mutable data structures, and many other useful programming constructs. Indeed, a memory ordering scheme that enables a dataflow machine to efficiently execute code written in general purpose, imperative languages (such as C, C++, Fortran, or Java) has eluded researchers for several decades. In contrast, the WaveScalar architecture provides a memory ordering scheme that efficiently executes programs written in any language.

Solving the memory ordering problem without resorting to a von Neumann-like execution model enables a completely decentralized dataflow processor to be built that eliminates all the large hardware structures that make superscalars nonscalable. Other recent attempts to build scalable processors, such as TRIPS (R. Nagarajan et al., "A design space evaluation of grid processor architectures," *International Symposium on Microarchitecture*, 2001 and K. Sankaralingam et al., "Exploiting ILP, TLP, and DLP with the polymorphous trips architecture," in *International Symposium on Computer Architecture*, 2003), Smart memories (K. Mai et al., "Smart memories: A modular reconfigurable architecture", in *International Symposium on Computer Architecture*, 2002) and Raw (W. Lee et al., "Space-time scheduling of instruction-level parallelism on a Raw machine," *International Conference on Architectural Support for Programming Languages and Operating Systems*, 1998), have extended the von Neumann paradigm in novel ways, but they still rely on a program counter to sequence program execution and memory access, limiting the amount of parallelism they can reveal. WaveScalar completely abandons the program counter and linear von Neumann execution.

WaveScalar is currently implemented on a substrate comprising a plurality of processing nodes that effectively replaces the central processor and instruction cache of a conventional system. Conceptually, WaveScalar instructions execute in-place in the memory system and explicitly send their results to their dependents. In practice, WaveScalar instructions are cached in the processing elements—hence the name "WaveCache."

The WaveCache loads instructions from memory and assigns them to processing elements for execution. They remain in the cache over many, potentially millions, of invocations. Remaining in the cache for long periods of time enables dynamic optimization of an instruction's physical placement in relation to its dependents. Optimizing instruction placement also enables a WaveCache to take advantage of predictability in the dynamic data dependencies of a program, which is referred to herein as "dataflow locality." Just like conventional forms of locality (temporal and spatial), dataflow locality can be exploited by cache-like hardware structures.

Multithreading

Multithreading is an effective way to improve the performance of a computing system, and designers have long sought to introduce architectural support for threaded applications. Prior work includes hardware support for multiple thread contexts, mechanisms for efficient thread synchronization, and consistency models that provide threads with a unified view of memory at lower cost. Because of this large body of work and the large amount of silicon resources available, threaded architectures are now mainstream in commodity systems.

Interestingly, no single definition of a thread has proven suitable for all applications. For example, web servers and other task-based systems are suited to coarse-grain, pthread-style threads. Conversely, many media, graphics, matrix, and string algorithms contain significant fine-grain data parallelism. In addition, sophisticated compilers are capable of detecting parallelism on several levels—from instructions to loop bodies to function invocations.

Individual architectures, however, tend not to support this heterogeneity. Threaded architectures usually target a specific thread granularity or, in some cases, a small number of granularities, making it difficult or inefficient to execute and synchronize threads of a different grain. For example, extremely fine-grain applications cannot execute efficiently on a shared memory multiprocessor due to the high cost of synchronization. In contrast, dataflow machines provide excellent support for extremely fine-grain threads, but must be programmed in specialized languages to correctly execute traditional coarse-grain applications. This requirement stems from dataflow's inability to guarantee that memory operations will execute in a particular order.

In principle, if it could solve the ordering issue, a dataflow architecture like WaveScalar could support a wide range of thread granularities by decomposing coarse-grain threads into fine-grain threads. It would thus be particularly useful to employ such an approach in the WaveScalar architecture to achieve even greater efficiencies in processing than can be achieved using only ordered memory for processing coarse grain threads.

Adding thread support to an architecture requires that designers solve several problems. First, they must determine what defines a thread in their architecture. Then, they must simultaneously isolate threads from one another and provide mechanisms, such as access to shared state and synchronization primitives, that allow them to communicate. Popular multithreaded systems such as SMPs, CMPs (see K. Olukotun et al., "The case for a single-chip multiprocessor," in Architectural Support for Programming Languages and Operating Systems, 1996), and SMTs (see D. M. Tullsen, et al., "Simultaneous Multithreading: Maximizing on-chip parallelism," in International Symposium on Computer Architecture, 1995) define a thread in terms of its state, including a register set, a program counter, and an address space. In multiprocessors, thread separation is easy, because each thread has its own dedicated hardware and threads can only interact through memory. SMTs and other processors that support multiple thread contexts within a single pipeline (e.g., Tera (see R. Alverson et al., "The Tera computer system," in International Conference on Supercomputing, pp. 1-6, 1990)) must exercise more care to ensure that threads do not interfere with one another. In these architectures, threads can communicate through memory, but other mechanisms are also possible.

The *T machine (see B. S. Ang et al., "StarT the next generation: integrating global caches and dataflow architecture," Tech. Rep. CSGmemo-354, MIT, 1994), the J-Machine (see M. Noakes et al., "The j-machine multicomputer: An architecture evaluation," 1993), and the M-machine (see M. Fillo et al., "The M-machine multicomputer," in International Symposium on Computer Architecture, 1995) define threads in similar terms but support two thread granularities. They use fine-grain threads to enable frequent communication (J-machine, *T) or hide latency (M-machine). Coarse grain threads handle long-running, complex computations (J-machine, *T) or group fine-grain threads for scheduling (M-machine). Threads communicate via shared memory (J-machine, M-machine), message passing (J-machine), and direct accesses of another thread's registers (M-machine).

The Raw machine offers flexibility in thread definition, communication, and granularity by exposing the communication costs between tiles in a CMP-style grid architecture. A thread's state is at least the architectural state of a single tile, but could include several tiles and their network switches. Threads communicate through shared memory or by writing to the register files of adjacent tiles. For tightly synchronized threads, the compiler can statically schedule communication to achieve higher performance.

The TRIPS processor supports multiple threads by reallocating resources that it would otherwise dedicate to speculatively executing a single thread. In essence, it uses multiple threads to hide memory and branch latencies instead of speculating. The parameters that define a thread remain similar to other architectures.

The EM-4 hybrid dataflow machine (see M. Sato et al., "Thread-based programming for the EM-4 hybrid dataflow machine," in International Symposium on Computer Architecture, 1992; and S. Sakai et al., "An architecture of a dataflow single chip processor," in International Symposium on Computer Architecture, 1989) defines a thread using a set of registers and a memory frame. Synchronization is performed in a dataflow style, and the programmer is provided with library routines that make synchronization explicit.

The similarity in thread representation among these architectures reflects their underlying architectures—all are essentially small, register-based, PC-driven fetch-decode-execute-style processors. In contrast, WaveScalar is a dataflow architecture, though not the first to grapple with the role of threads. Most notably, the Monsoon architecture (see G. M. Papadopoulos et al., "Monsoon: An explicit token-store architecture," in International Symposium on Computer Architecture, 1990; and G. M. Papadopoulos et al., "Multithreading: A revisionist view of dataflow architectures", International Symposium on Computer Architecture, 1991), the P-RISC architecture (see R. S. Nikhil et al., "Can dataflow subsume von Neumann computing?," in International Symposium on Computer Architecture, 1989, Computer Architecture News, 17(3), June 1989) and the Threaded Abstract Machine (TAM) architecture (see D. E. Culler et al., "Fine-grain parallelism with minimal hardware support: A compiler-controlled threaded abstract machine," in Proceedings of the 4th International Conference on Architectural Support for Programming Languages and Operating Systems, 1991) have developed, to different extents, a model of dataflow machines as systems of interacting, fine-grained imperative threads.

P-RISC adapts ideas from dataflow to von Neumann multiprocessors. To this end, it extends a RISC-like instruction set with fork and join instructions and the notion of two-phase memory operations. Programs consist of numerous small imperative threads with small execution contexts. Whenever a thread blocks on a long-latency operation, such as a remote load, another thread is -removed from a ready queue (called the token queue) and executes. Synchronization between threads is handled with explicit memory instructions.

Programs for the Monsoon Explicit Token Store (ETS) architecture can be organized as collections of short, von Neumann-style threads that interact with each other and with memory using dataflow-style communication. The technique improves code scheduling by taking advantage of data locality. It also leads to an extension to the architecture in which the short, imperative threads employ a small set of high-speed temporary registers that are not part of the threads' stored context. Synchronization between threads is implicit, through the dataflow firing rule and presence bits in memory.

The TAM architecture adapts the Monsoon and P-RISC ideas to take advantage of hierarchical memory and scheduling systems. It does this by allowing the compiler more authority in scheduling code and data, adding a new level of scheduling hierarchy (called a quantum), and restricting communication between different groups of threads to well-defined communication interfaces. Synchronization between threads is explicit, as in P-RISC.

However, none of the prior art discussed above provides a workable solution for adapting an ordered memory dataflow architecture, such as WaveScalar, as necessary for enabling efficient processing using both fine- and coarse-grained threads. Accordingly, there is a need to provide a solution that includes the benefits of the dataflow architectures with such a multigrained thread processing capability.

SUMMARY

Prior WaveScalar work developed an ISA and microarchitecture to execute a single coarse-grain thread of execution, which as noted above, is referred to herein as the WaveScalar architecture. Here, that design is expanded to support multiple threads. Support for multiple threads by this exemplary dataflow architecture was developed by providing the following software mechanisms:

Specific instructions that turn wave-ordered memory on and off. Since each thread in WaveScalar has a separate memory ordering, this approach is tantamount to creating and terminating coarse-grain threads.

A simple synchronization primitive that builds a hardware queue lock. This instruction provides memoryless, distributed, interthread synchronization by taking advantage of dataflow's inherent message passing, making it a good match for WaveScalar's distributed microarchitecture.

A new set of memory operations that enable applications to access memory without adhering to a global memory ordering. These instructions bypass wave-ordered memory, enabling independent memory operations to execute in parallel.

A dataflow version of a memory fence instruction that enables applications to use relaxed consistency models and which also serves as an intrathread synchronization mechanism for threads whose memory operations bypass wave-ordered memory.

Taken together, these mechanisms enable a dataflow architecture, such as the exemplary WaveScalar approach, to define and differentiate threads with a wide range of granularity. The new wave-ordered memory control mechanisms and the memoryless synchronization primitive, combined with an extended dataflow tag, provide coarse-grain, pthread-style threads. The memory fence mechanism ensures that the execution state of these threads becomes consistent with memory, even under a relaxed consistency model. The result is a much greater efficiency and processing speed. For example, using this multithreaded support, Splash-2 benchmarks executing on WaveScalar architecture were found to achieve speedups of 30-83 times, compared to single-threaded execution.

In addition, in an exemplary embodiment, WaveScalar uses the memory operations that bypass wave-ordered memory and both synchronization primitives to create extremely small threads. These "unordered threads" have very little overhead and may use very few hardware resources. Hence, they are extremely useful for expressing finer-grain loop and data parallelism and can be used to complete, for example, 7-13.5 multiply-accumulates (or similar units of work) per cycle, for three commonly used kernels.

It has been shown that using this approach, conventional, coarse-grain threads and fine-grain, unordered threads can interact seamlessly in the same application. To demonstrate that integrating both styles is possible and profitable, they were applied to equake from the Spec2000 benchmark suite. The outermost loop of equake was parallelized with coarse-grain, pthread-style threads and a key inner-loop was implemented with fine-grain threads that use unordered memory. The results demonstrated that the multigranular threading approach achieves significantly better performance than either the coarse- or fine-grain approaches alone.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 8:
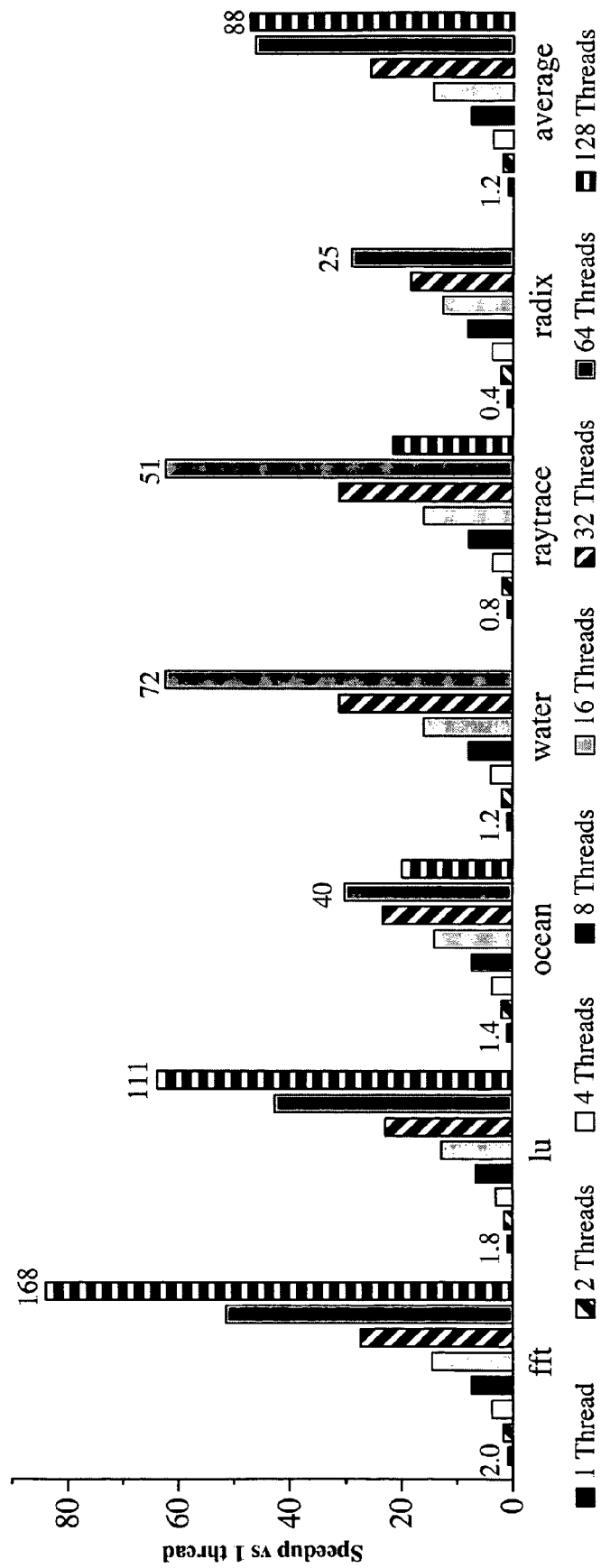
Figure 9:
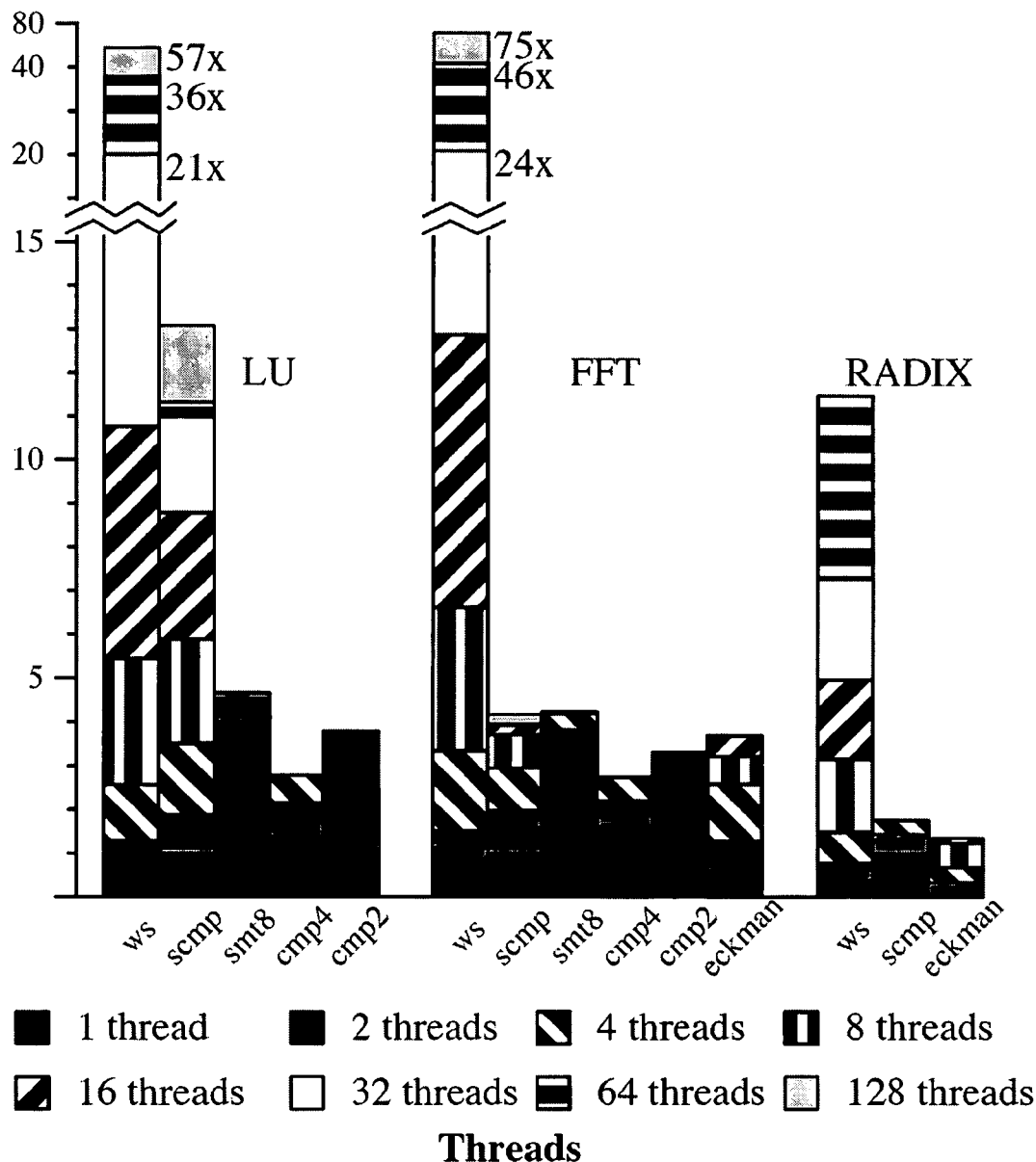
Figure 13:
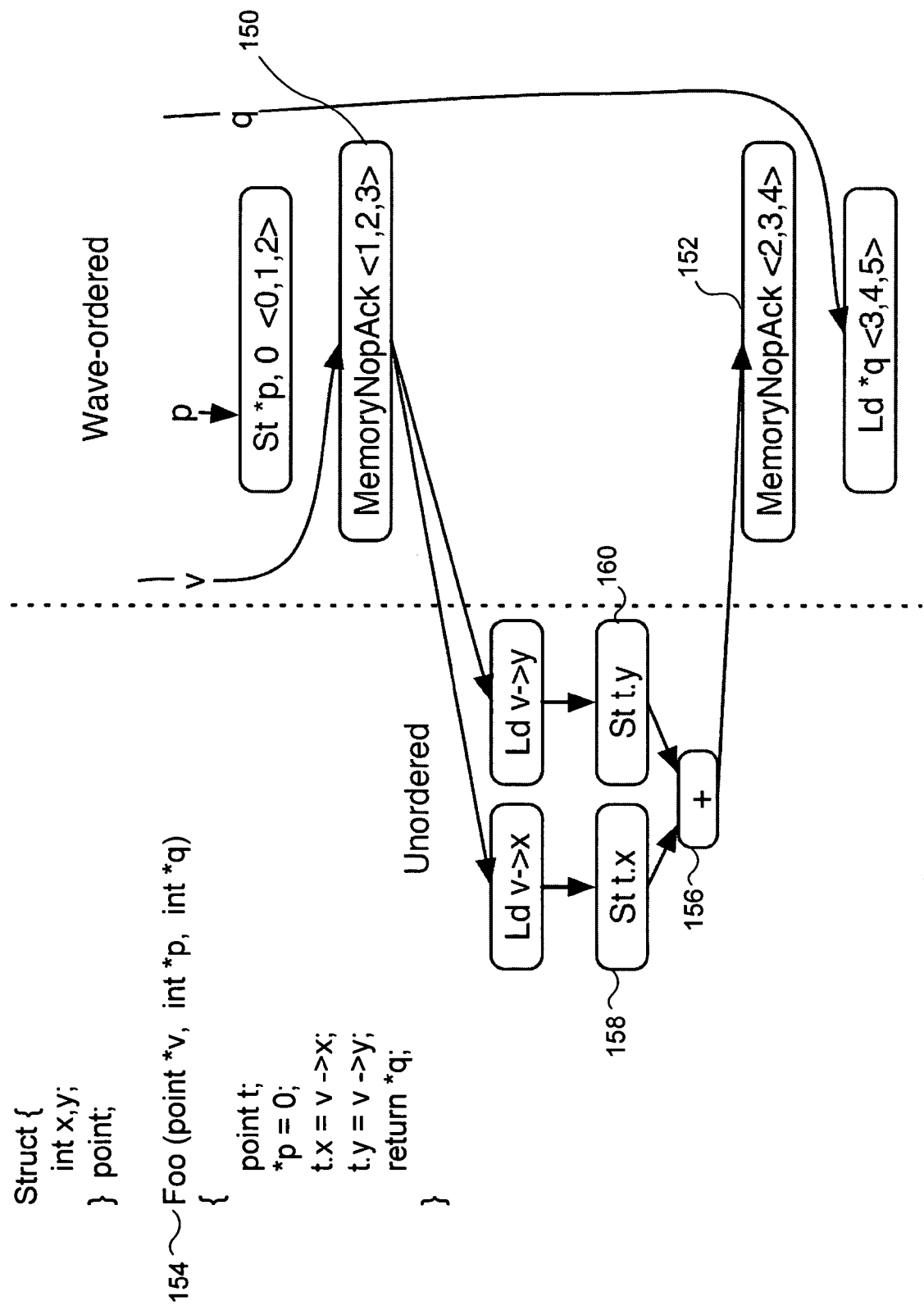
Figure 14:
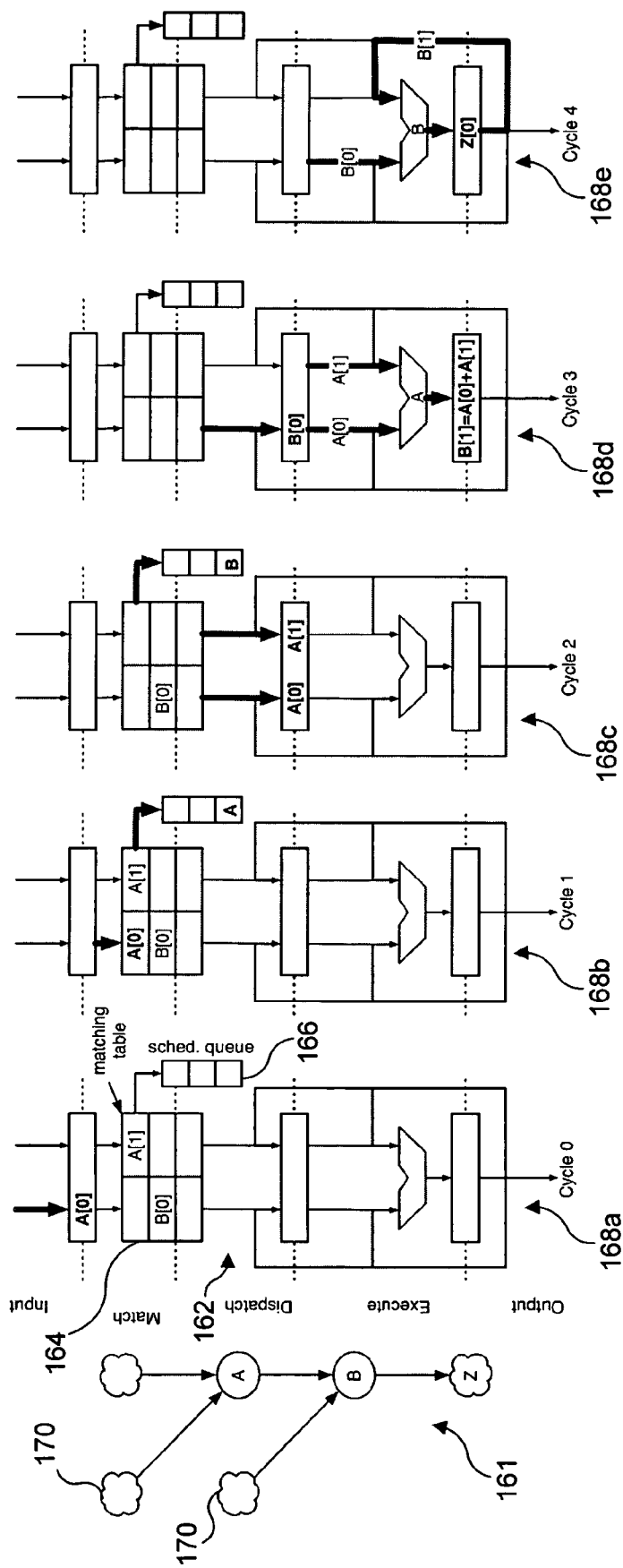
Figure 15:
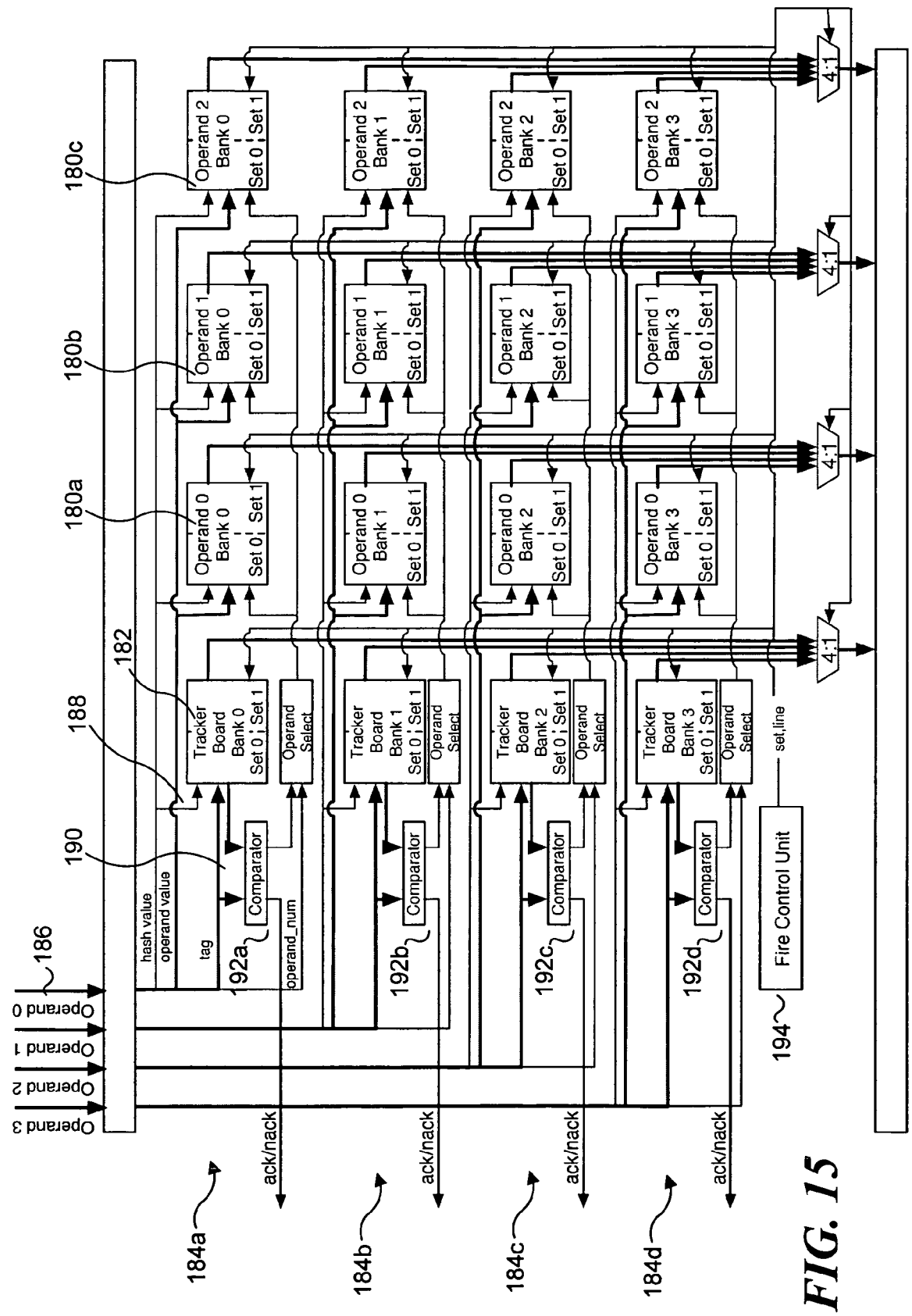
Figure 16:
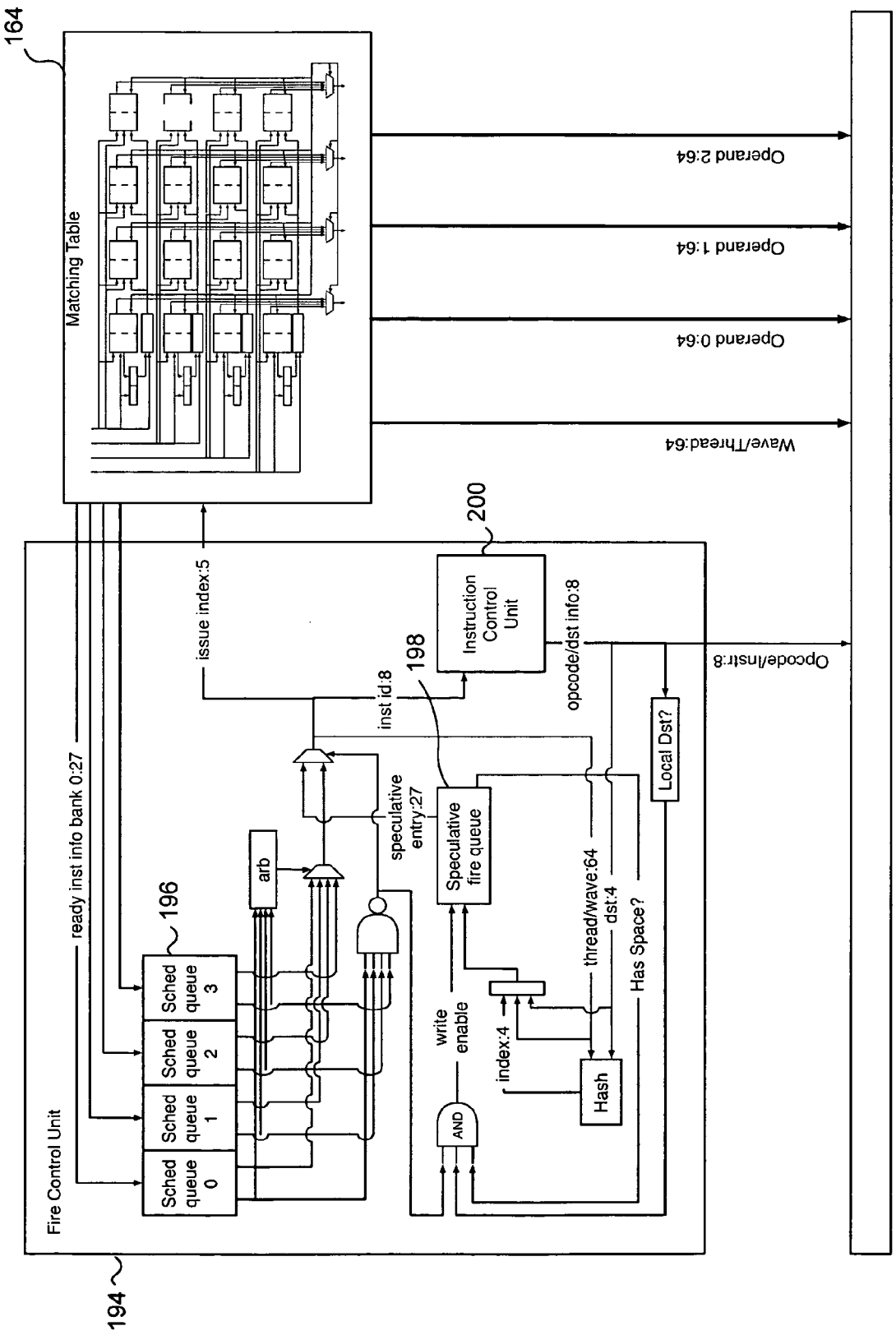
Figure 17:
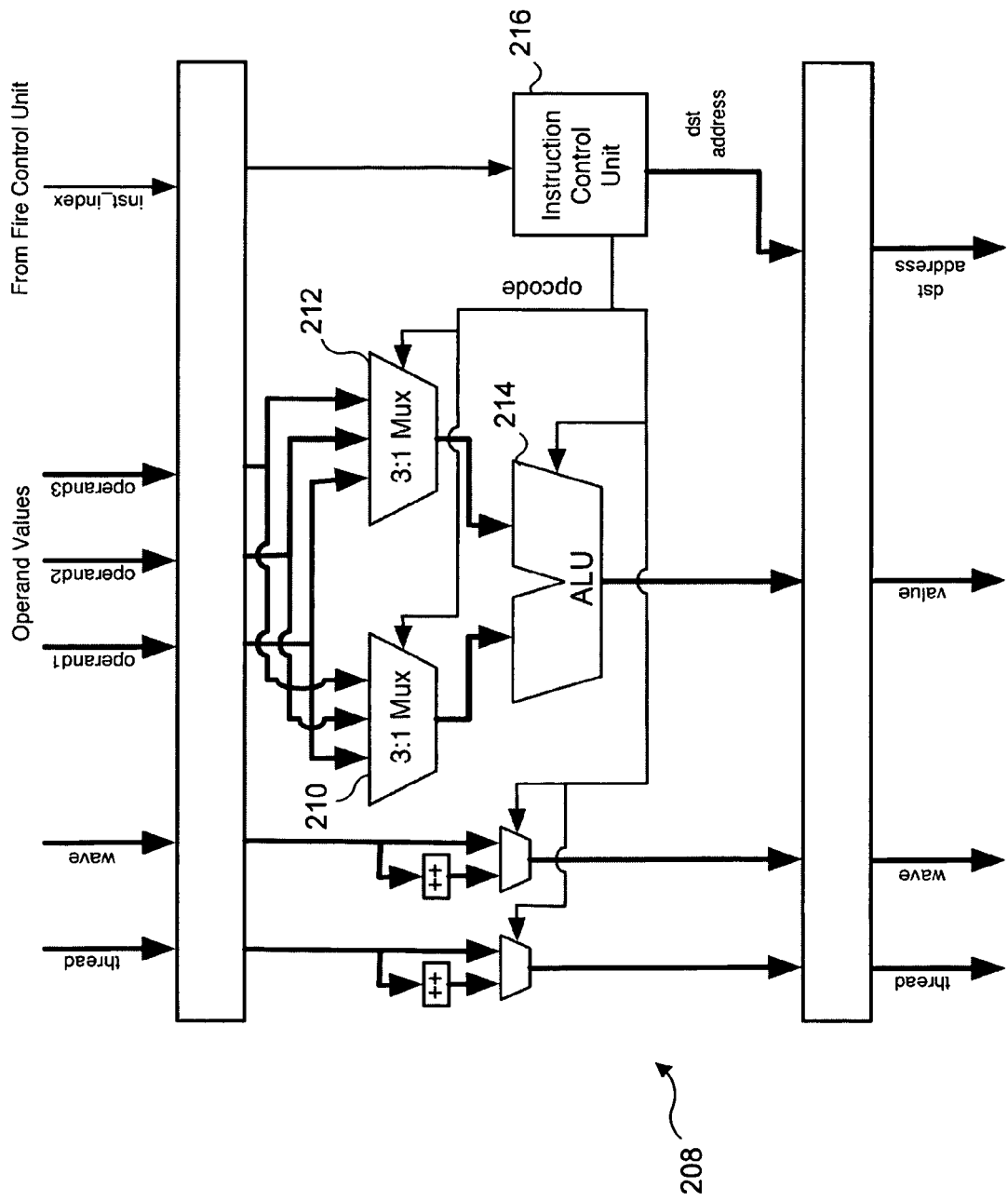
Figure 18:
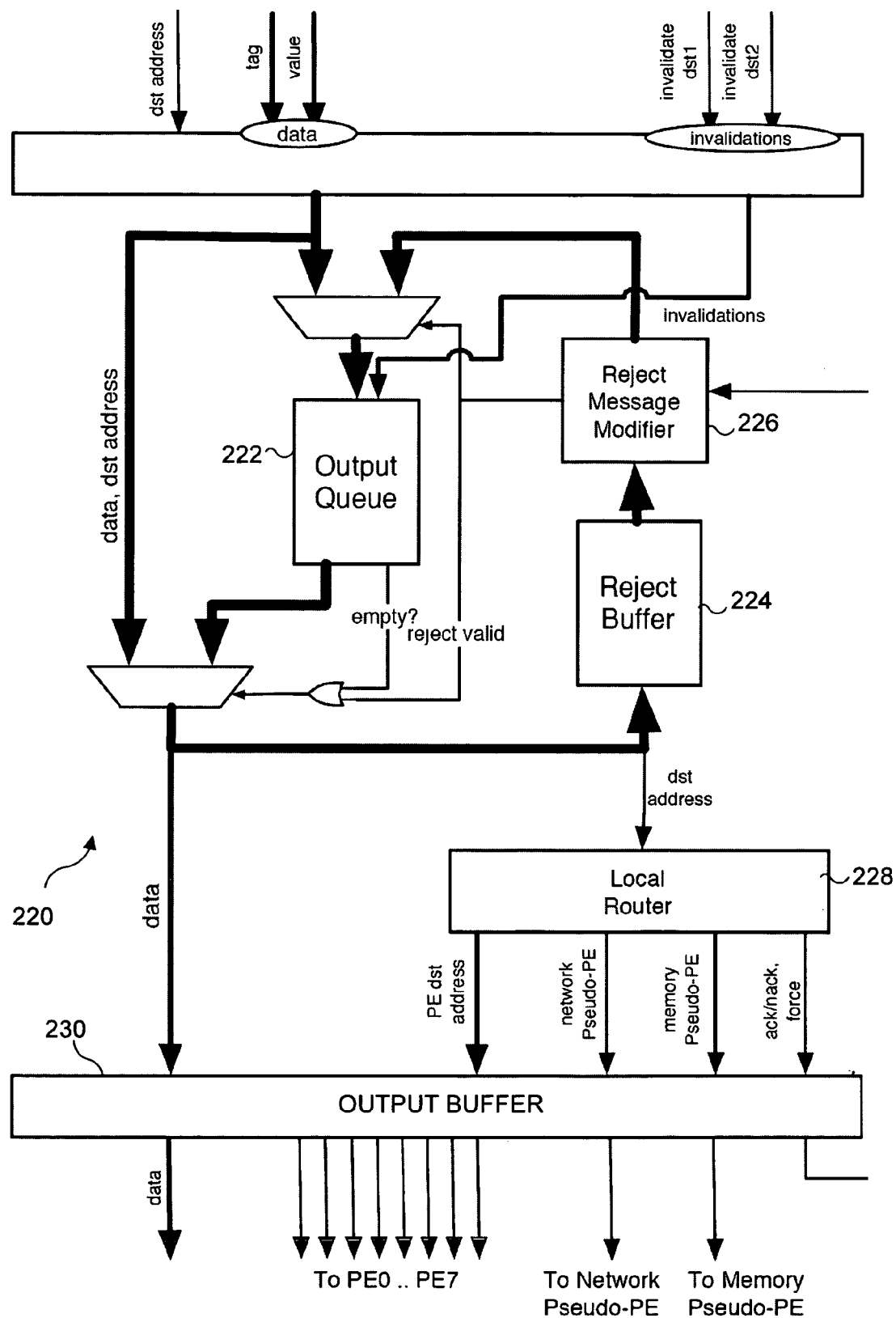
Figure 19:
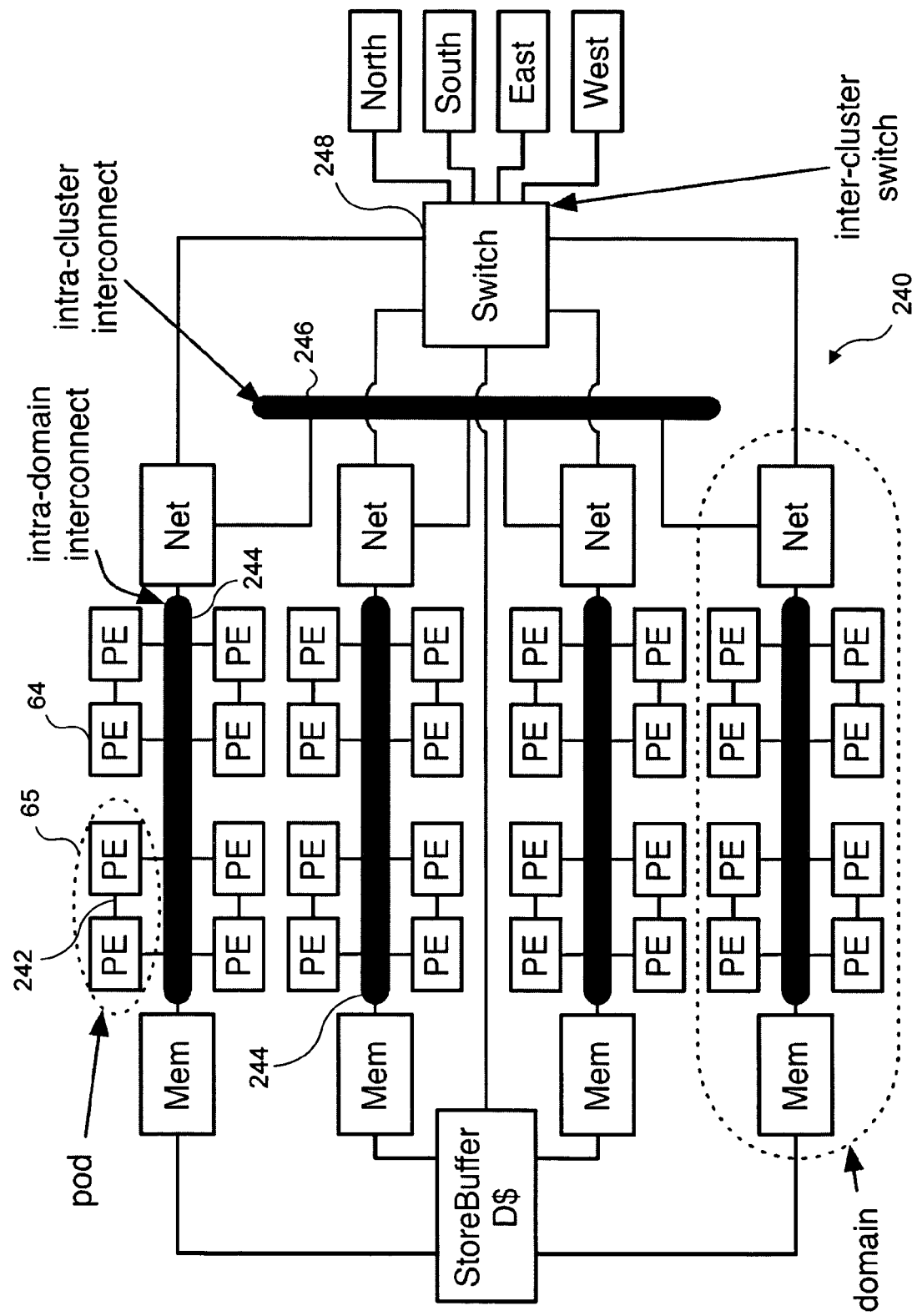
Figure 20:
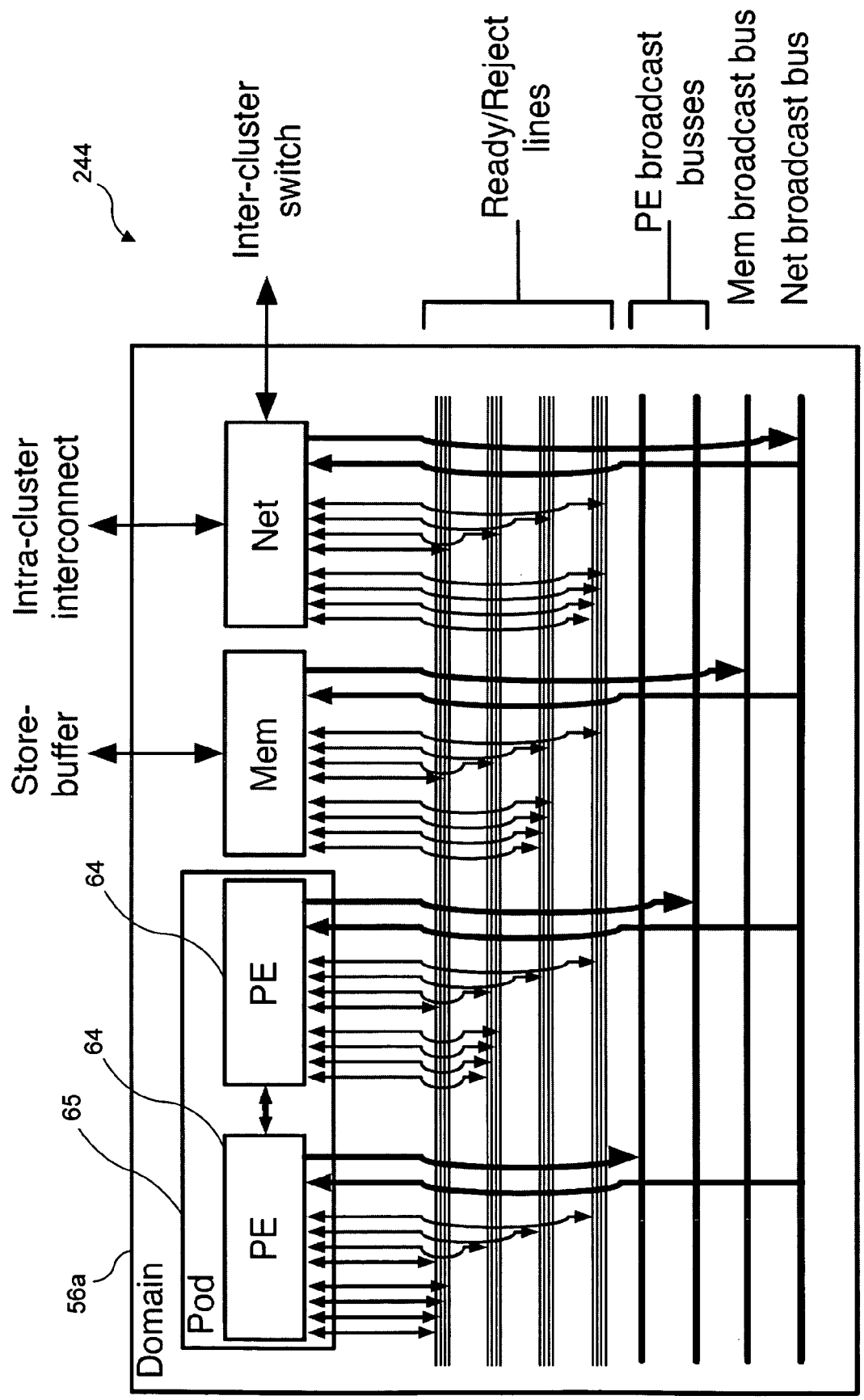
Figure 21:
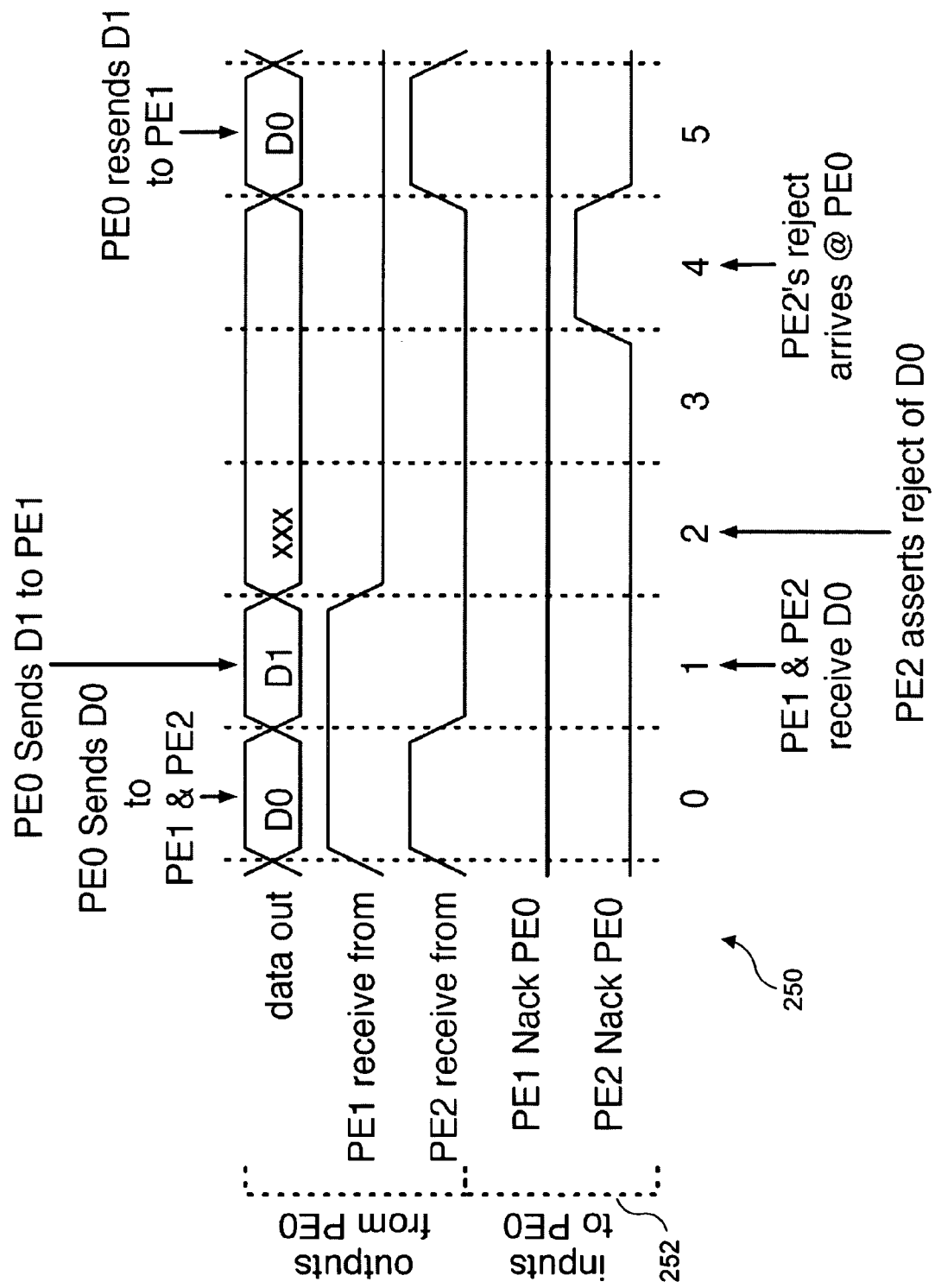
Figure 22:
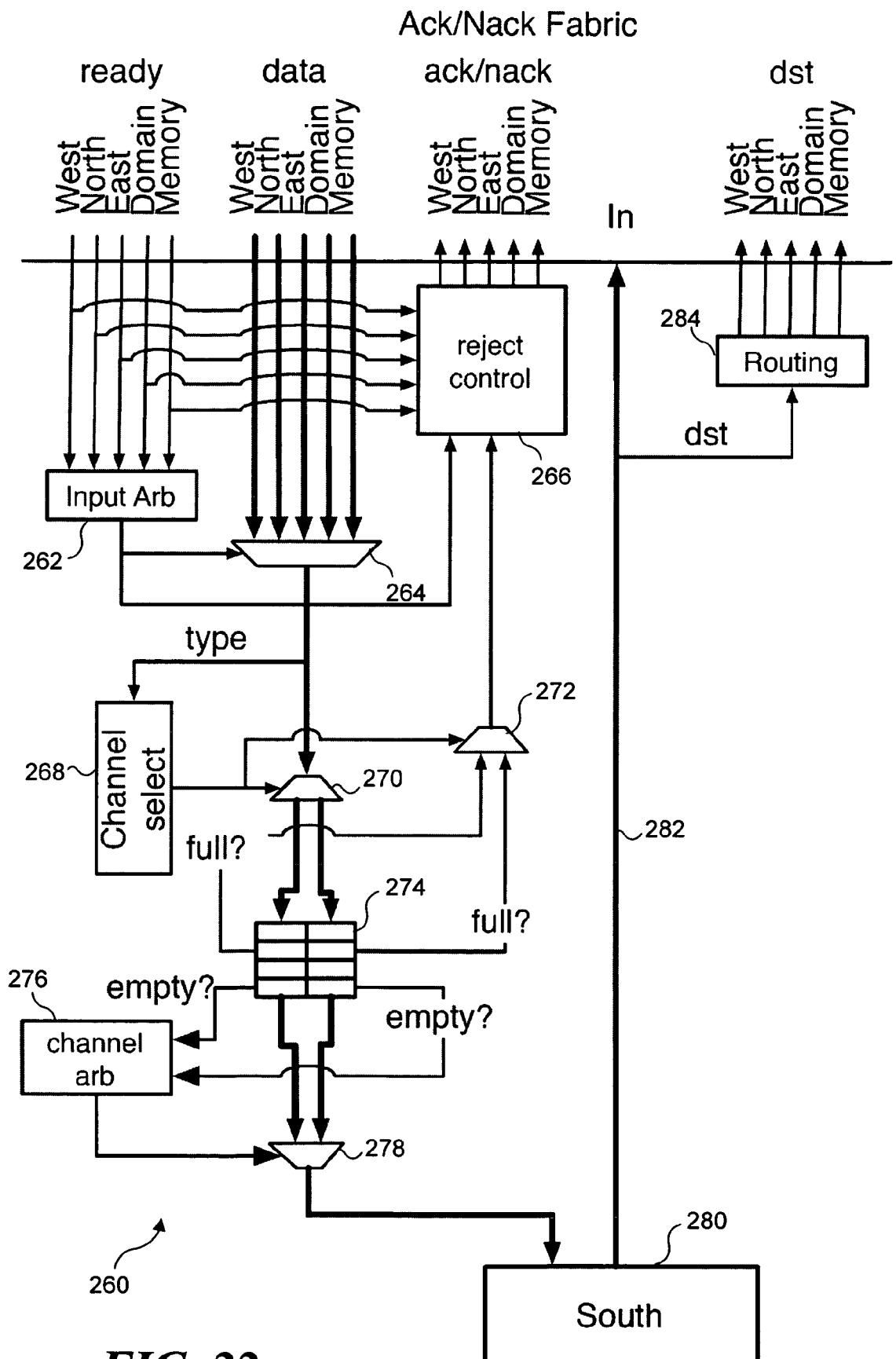
Figure 23:
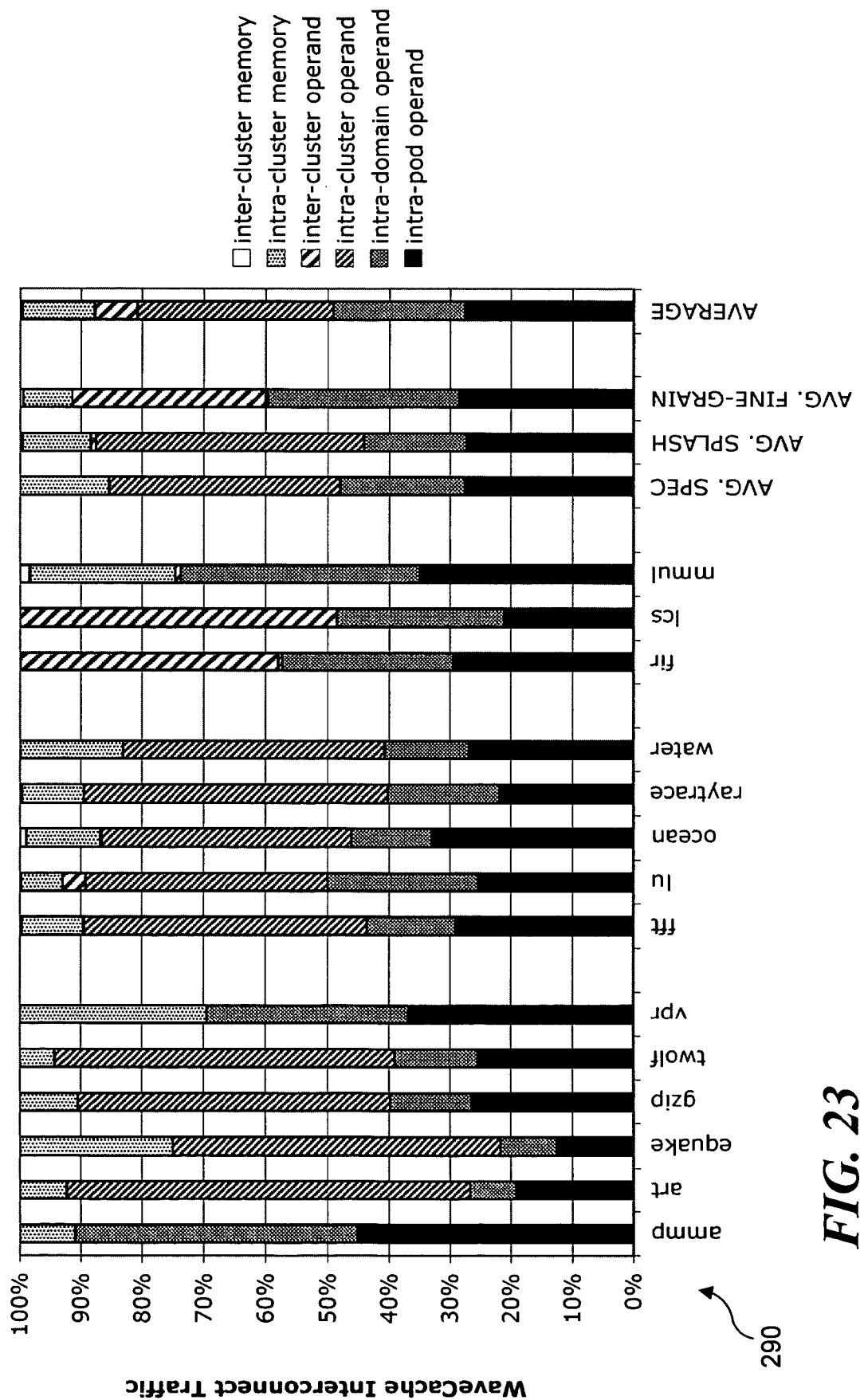
Figure 24:
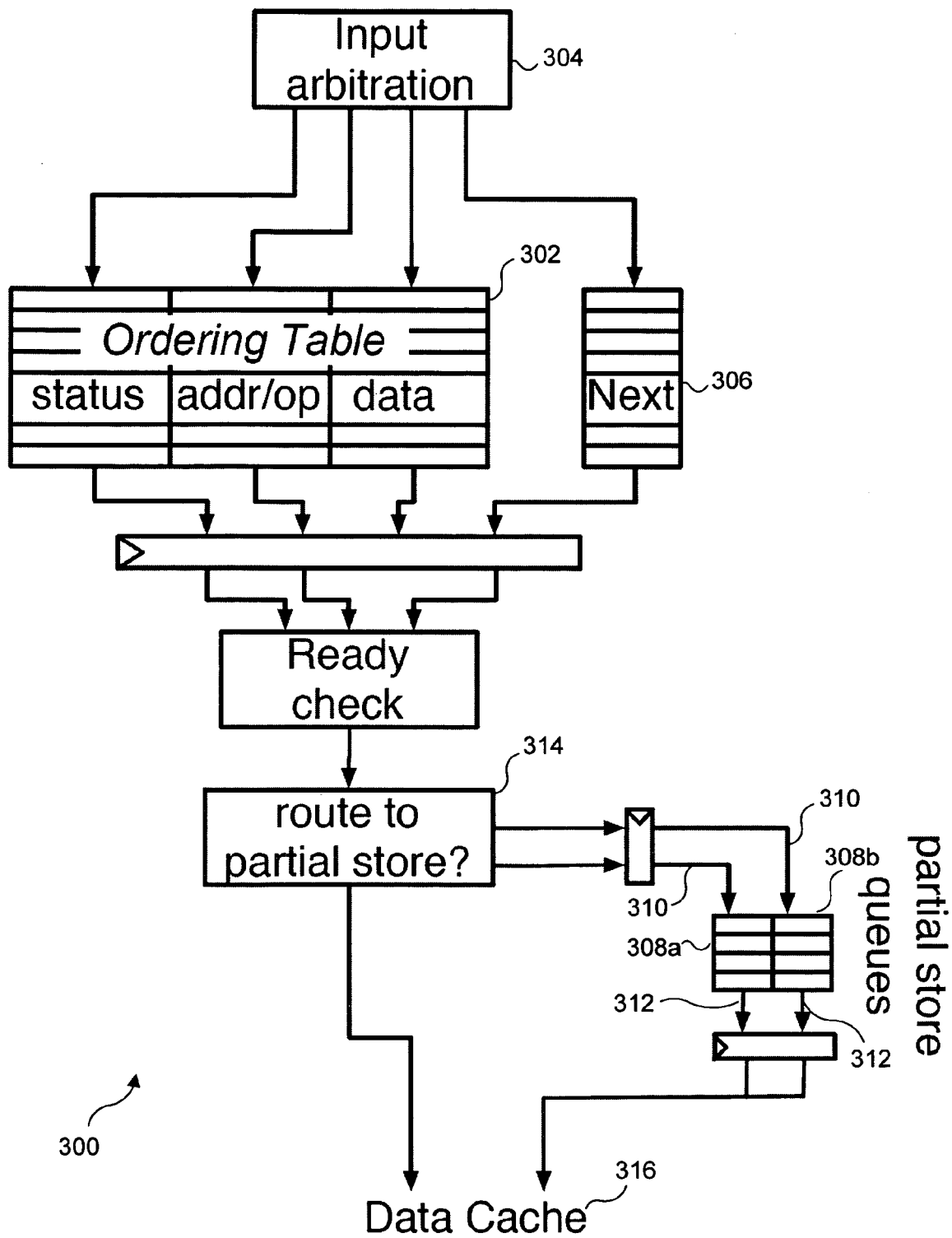
Figure 25:
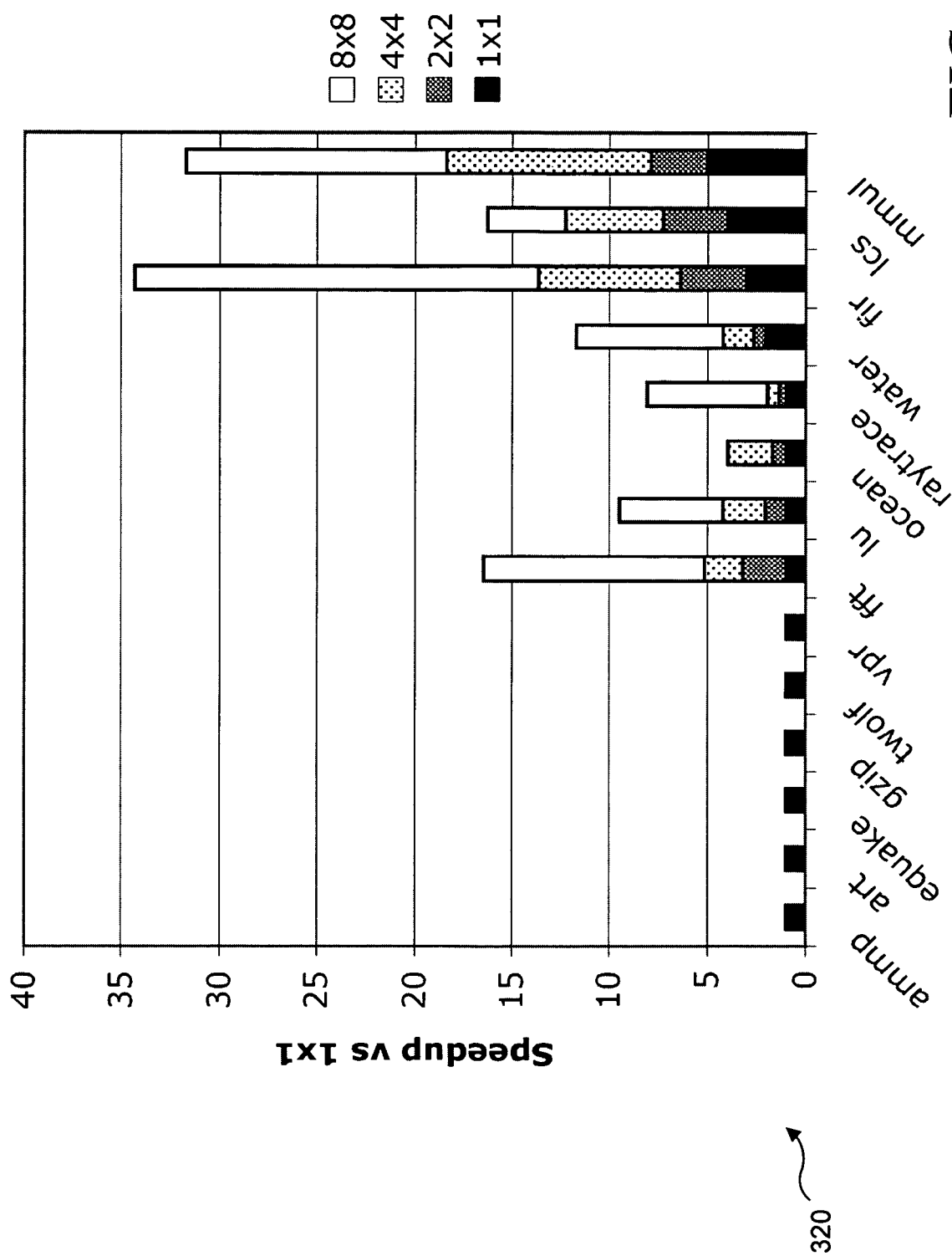
Figure 26:
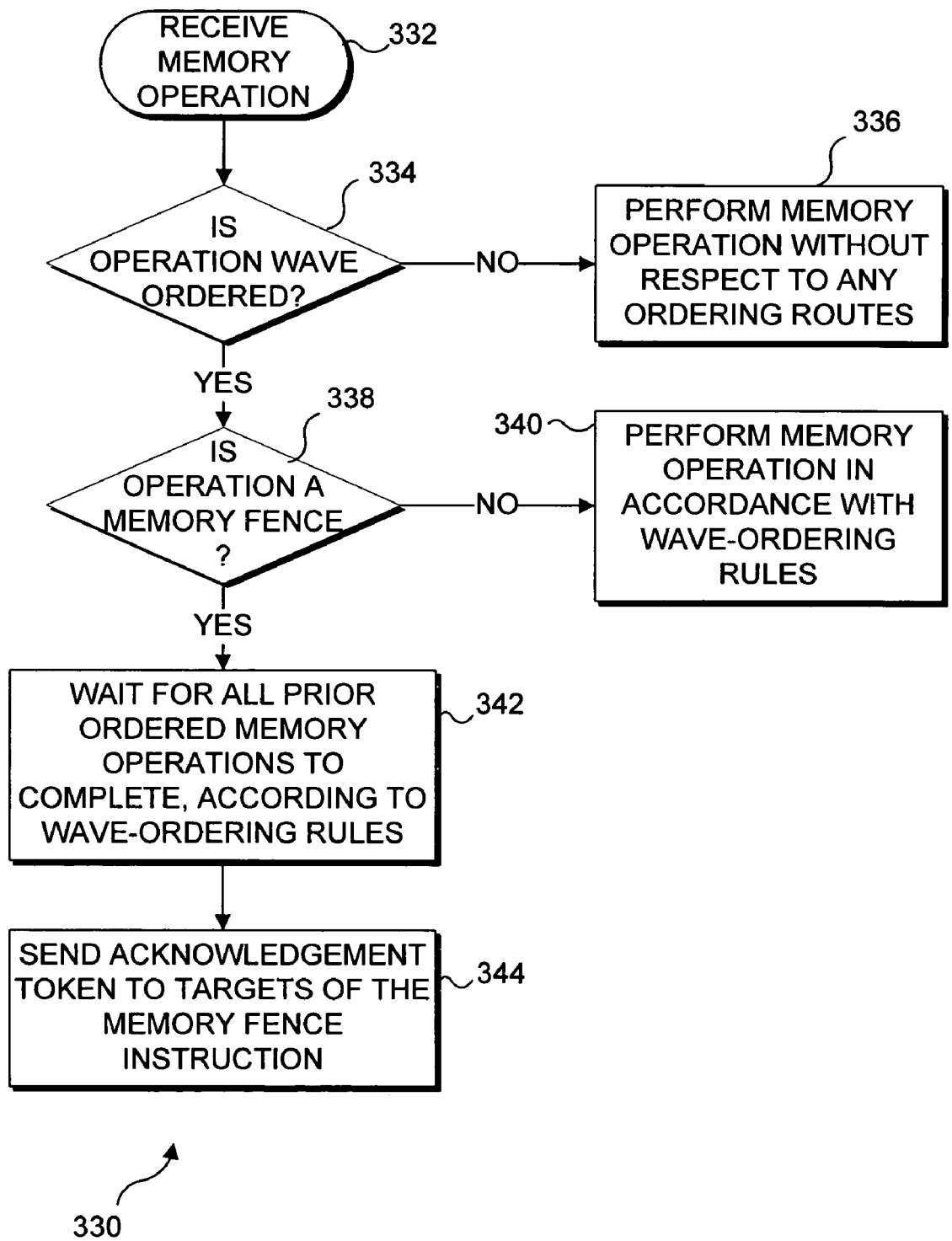
Figure 27:
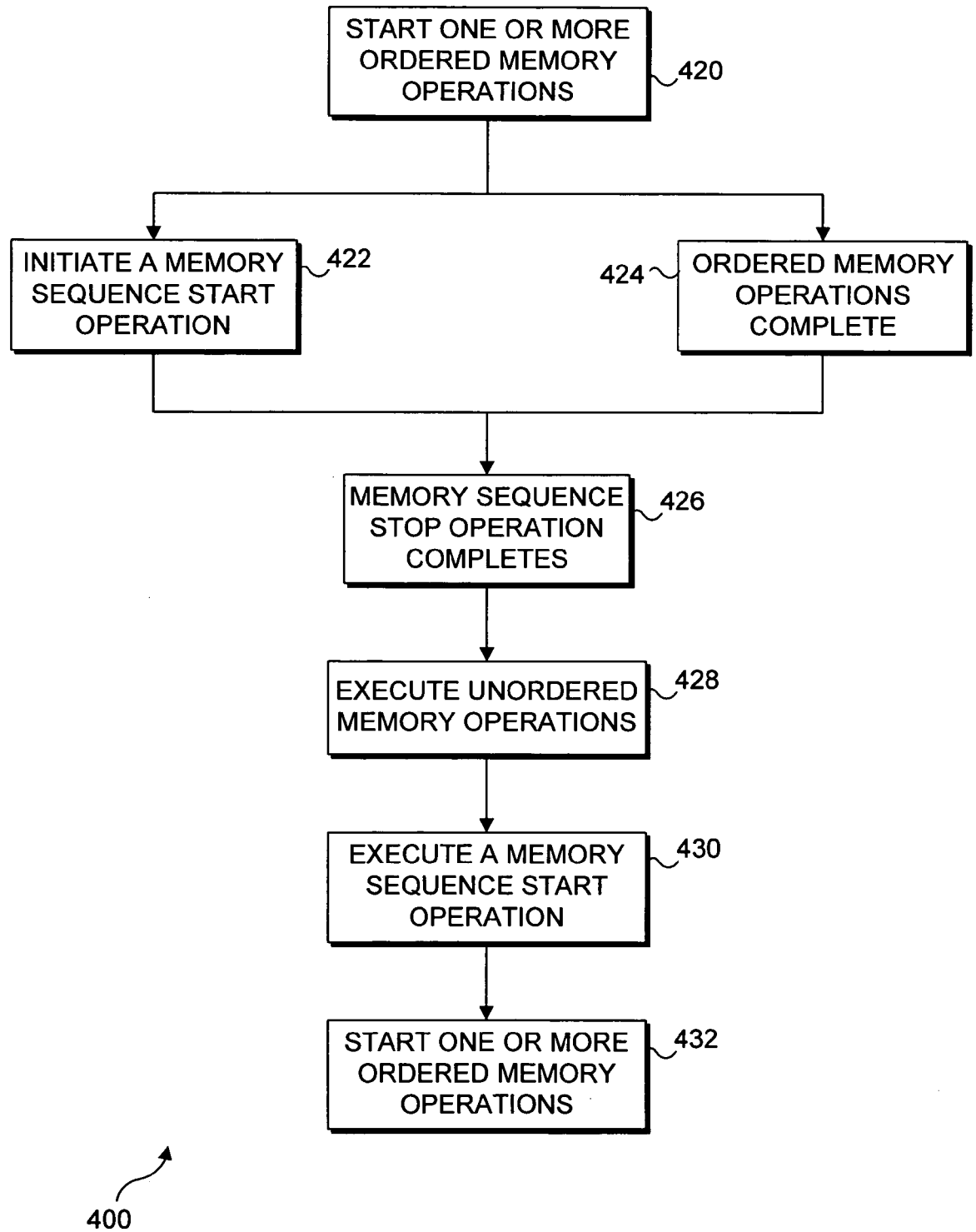
Figure 28:
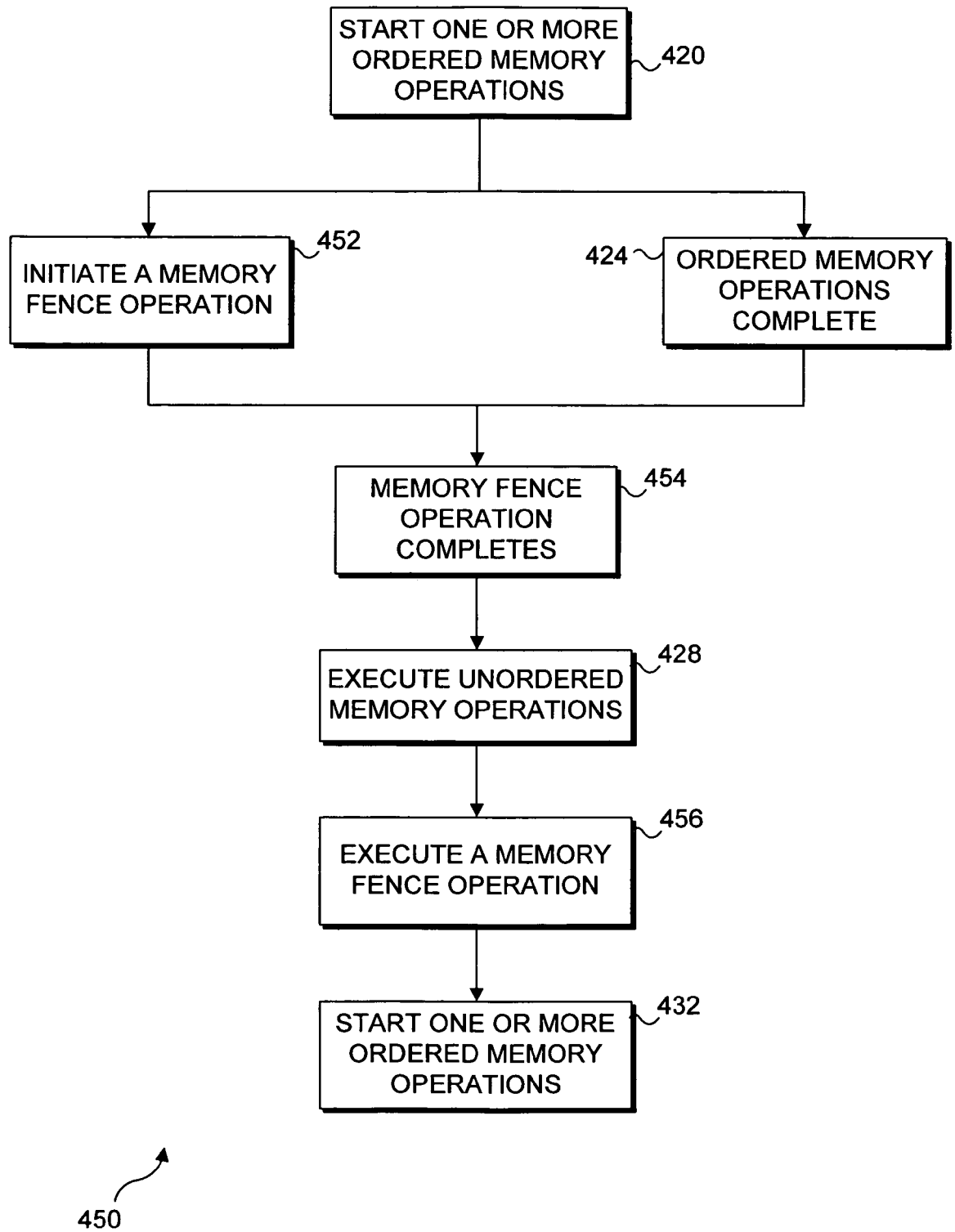
Figure 29:
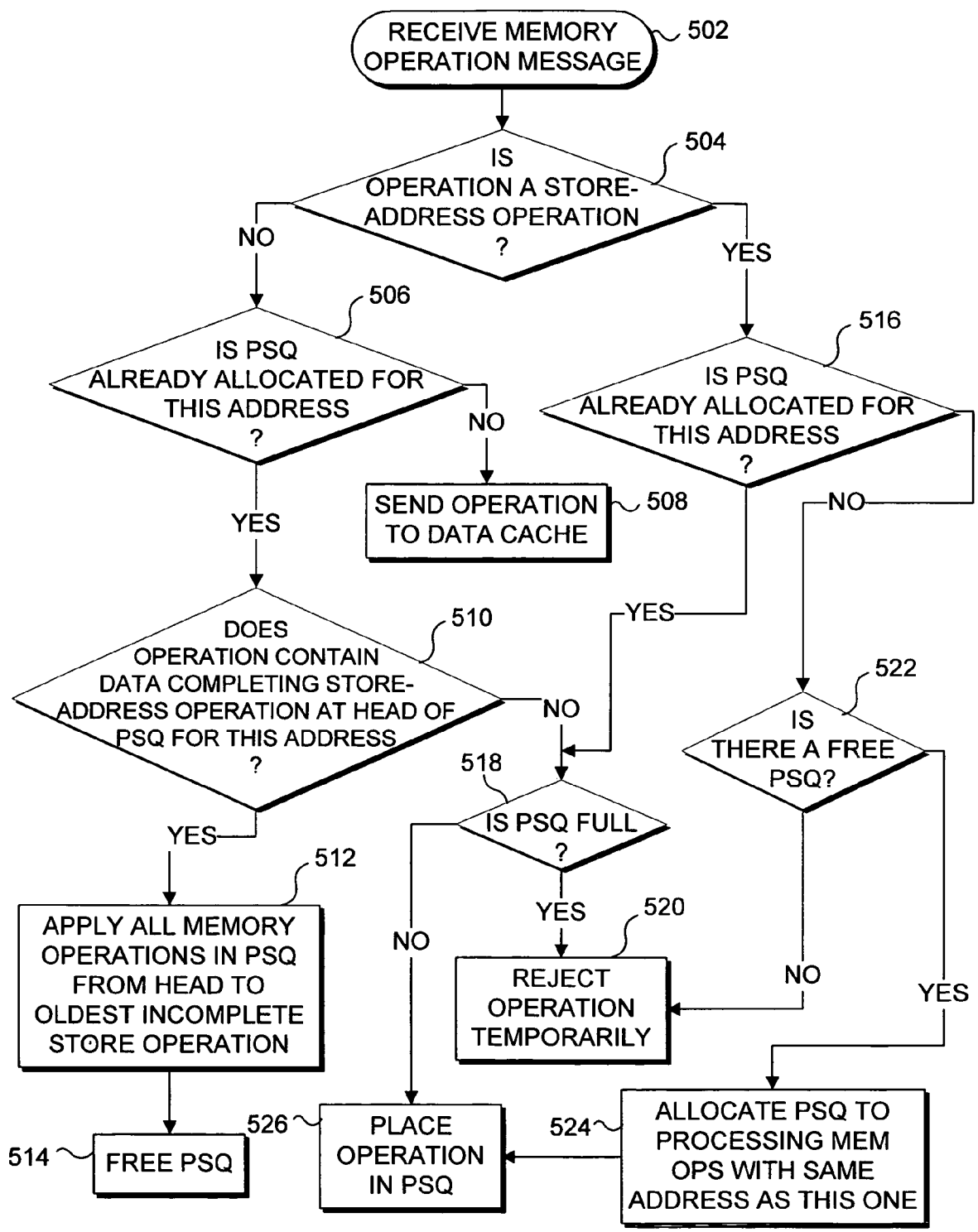

FIGS. 6A and 6B illustrate exemplary contrasting cases for matching inputs, indicating how most instructions, like the ADD instruction shown in FIG. 6A, fire when the thread and wave numbers on both input tokens match, while in contrast, inputs to a THREAD-COORDINATE instruction shown in FIG. 6B match if the THREAD-ID of the token on the second input matches the data value of the token on the first input;

FIG. 7 illustrates an example wherein a THREAD-COORDINATE instruction is used to construct a mutual exclusion (mutex) object;

FIG. 8 is a graph showing benchmarks for Splash-2 on the exemplary WaveCache for between 1 and 128 threads, wherein the bars represent speedup in total execution time, and the numbers above the single-threaded bars are IPC for that configuration (note that two benchmarks, water and radix, cannot utilize 128 threads with the input data set used);

FIG. 9 is a graph comparing the performance of various architectures, wherein each bar represents the performance of a given architecture for a varied number of threads;

FIGS. 10 and 11 are graphs comparing the performance of three implementation styles, measured in multiply-accumulates for a matrix multiply (MMUL) and a finite input response (FIR) filter, and in character comparisons for a longest common subsequence (LCS), wherein the graph in FIG. 10 shows execution-time speedup relative to a serial coarse-grain implementation, and the graph in FIG. 11 compares the work per cycle achieved by each implementation style;

FIG. 12 is a schematic illustration showing transitioning between ordered and unordered memory interfaces;

FIG. 13 illustrates an example using ordered and unordered memory together, where MEMORY-NOP-ACK is used to combine ordered and unordered memory operations to express memory parallelism;

FIG. 14 is a schematic block diagram illustrating an exemplary flow of operands through the PE pipeline and forwarding networks;

FIG. 15 is schematic diagram illustrating details of an exemplary matching table that uses a large number of small, single-ported SRAMS to allow up to four operands to be written each cycle, wherein a tracker board detects when instructions are ready to fire;

FIG. 16 is schematic diagram illustrating details of the dispatch stage and fire control unit (FCU), which are in charge of scheduling instructions for execution, wherein the DISPATCH schedules execution on the arithmetic logic unit (ALU) and is in charge of allowing dependent instruction to execute on consecutive cycles;

FIG. 17 is a schematic diagram illustrating an exemplary execution (EXECUTE) stage of a PE that includes a single general purpose ALU, which accepts three input operands and implements the WaveScalar instruction set;

FIG. 18 is a schematic diagram illustrating the OUTPUT interface, which distributes the PE's output to consumers, wherein the output resides in the output queue until sent;

FIG. 19 is a schematic diagram illustrating a high-level view of the interconnects within a cluster;

FIG. 20 is a schematic diagram showing an exemplary view of the intra-domain interconnect (for space reasons, the interconnect for a 2-PE (1 pod) domain is shown, although the exemplary design includes 8-PEs); the thick horizontal lines are the broadcast busses for each PE and the network and memory interfaces, while the fine lines convey the ACK and NAK signals;

FIG. 21 are exemplary ACK/NAK timing diagrams for a simple transaction between PE0 and PE1/PE2;

FIG. 22 is a schematic diagram illustrating the southern port of an exemplary inter-cluster switch, wherein incoming messages are routed toward their destination (West, North, East, PEs, or Store buffer/L1 Cache), and depending on the type of an outgoing message, the switch uses one of two virtual channels to route the message;

FIG. 23 is a graph showing the distribution of interconnect traffic in the WaveCache for a plurality of different applications, wherein a majority of traffic in the WaveCache is confined within a single cluster and for many applications, over half travels only over the intra-domain interconnect;

FIG. 24 is a schematic diagram illustrating the store buffer logic and structures needed to order a single wave of memory requests;

FIG. 25 is a graph illustrating the performance (i.e., speedup) of the WaveScalar architecture, for different microarchitectural implementations, when running a variety of applications;

FIG. 26 is a flowchart illustrating exemplary logical steps for processing memory operations;

FIG. 27 is flowchart illustrating exemplary logical steps for combining ordered and unordered memory operations using a memory sequence start instruction;

FIG. 28 is flowchart illustrating exemplary logical steps for combining ordered and unordered memory operations using a memory fence instruction; and FIG. 29 is a flowchart illustrating exemplary logical steps for implementing partial store control.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

WaveScalar Overview

This overview discusses only those portions of the WaveScalar architecture that provide a context for the multigranular threading approach. A more in-depth description of WaveScalar is provided in the previously filed U.S. Patent Application, noted above, which has been incorporated herein by reference.

The WaveScalar Instruction Set

In most respects, the WaveScalar instruction set provides the same computing capabilities as a RISC instruction set. Differences occur primarily because it is a dataflow architecture, and with a few notable exceptions, it follows the examples of previous dataflow machines.

WaveScalar binaries: A WaveScalar binary is a program's dataflow graph. Each node in the graph is a single instruction that computes a value and sends it to the instructions that consume it. Instructions execute after all input operand values have arrived according to a principle known as the dataflow firing rule.

Waves and wave numbers: When compiling a program for WaveScalar, a compiler breaks its control flow graph into pieces called waves. The key properties of a wave are: (1) its instructions are partially ordered (i.e., it contains no back-edges), and (2) control enters at a single point. Unlike a similar construct, hyperblocks, waves may contain true control-flow joins without predication. Doing so facilitates the easy creation of large waves by unrolling loops.

Multiple waves composed of the same static code (for example, iterations of a loop) may execute simultaneously. To distinguish these instances, known as dynamic waves, each value in the WaveScalar ISA carries a tag, called a WAVE- NUMBER. Together, a value and its WAVE-NUMBER form a token. The WaveScalar ISA includes special instructions that manipulate WAVE-NUMBERs. Memory-ordering hardware, described below, constrains the number of simultaneously executing waves, and schedules their memory operations in program order.

Memory ordering: Most programming languages provide the programmer with a model of memory that totally orders memory operations. Lacking an efficient mechanism to support this total load-store ordering, most previous dataflow architectures could not effectively execute programs written in imperative languages (e.g., C, C++, or Java). WaveScalar overcomes this limitation with a technique called wave-ordered memory. In wave-ordered memory, the compiler uses the control flow graph and the instruction order within basic blocks to annotate each memory operation with: (1) its position in its wave, called a sequence number, and, (2) its execution order relative to other memory operations in the same wave. As the memory operations execute, these annotations travel to the memory system, allowing it to apply memory operations in the correct order.

To annotate each memory instruction in a wave, the WaveScalar compiler traverses the wave's control flow graph in breadth-first order. Within the basic block at each CFG node, it assigns consecutive sequence numbers to consecutive memory operations. Next, the compiler labels each memory operation with the sequence numbers of its predecessor and successor memory operations, if they can be uniquely determined (see the left side of FIG. 1). Since branch instructions create multiple predecessors or successors, a special wildcard value, '?', is used in these cases.

Figure 1:
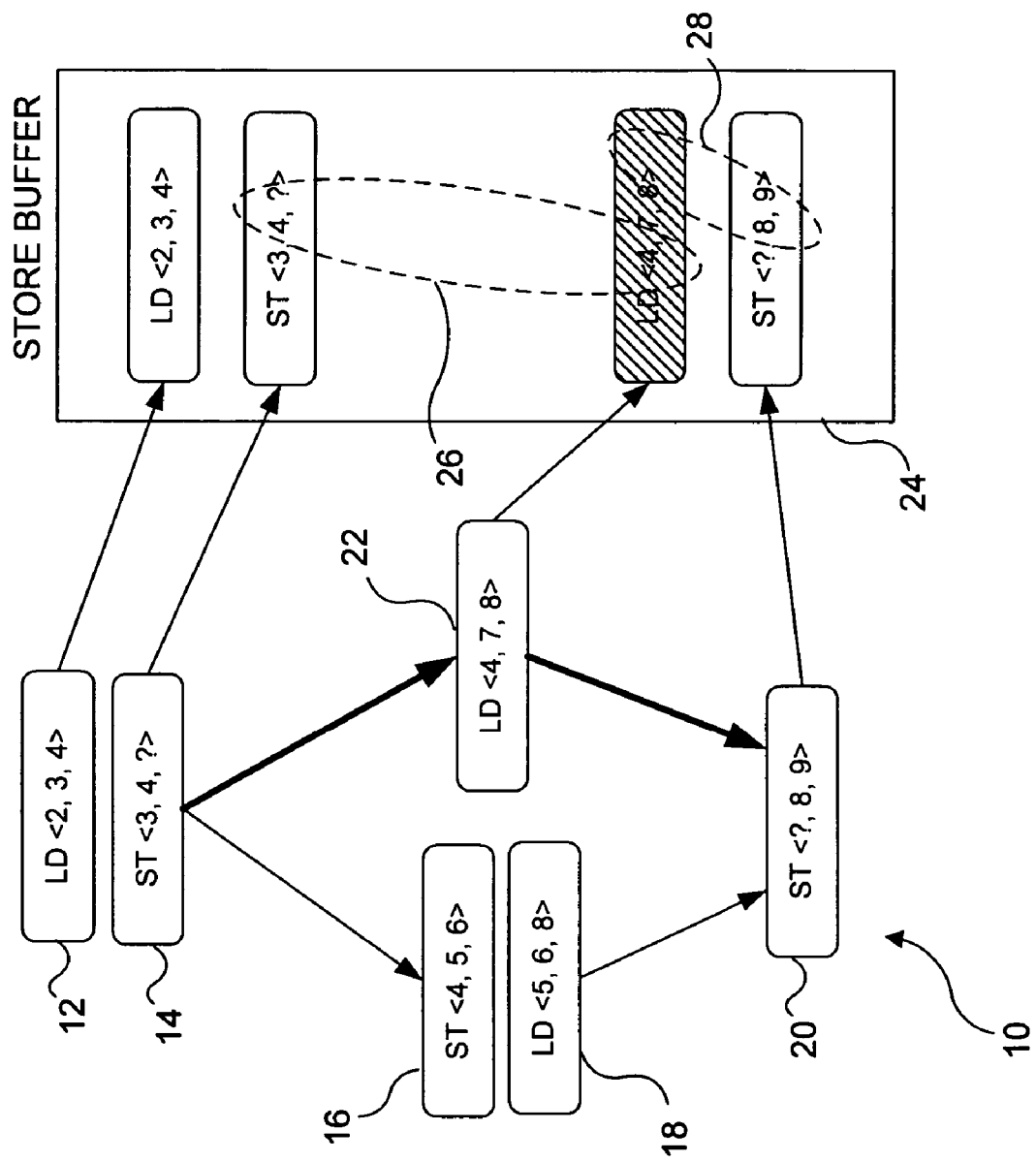
FIG. 1 illustrates an exemplary wave control flow graph, showing the memory operations in each basic block, their ordering annotations, and how the annotations enable the store buffer to reconstruct the correct order, where the darker arrows show the executed path.

During program execution, the memory system (in our implementation, a store buffer) uses these annotations to assemble a wave's loads and stores in the correct order. The right side of FIG. 1 shows how the wave-order annotations allow the store buffer to order memory operations and detect those that are missing. The left side of FIG. 1 illustrates an example 10 of memory operations and their wave-ordered annotations 12, 14, 16, 18, 20, and 22. During program execution, a store buffer 24 uses these annotations to assemble a wave's loads and stores in the correct order. FIG. 1 (right side) shows how the wave-order annotations enable the store buffer to order memory operations and detect those that are missing. Assume the load with sequence number 7 (grayed out) is the last instruction to arrive at the store buffer. Before its arrival, the store buffer knows that at least one memory operation between memory operations 14 and 20, i.e., numbers 4 and 8, is missing, because 4's successor and 8's predecessor are both '?'. As a result, memory operation 20, i.e., number 8, cannot be executed. The arrival of load memory instruction 22, i.e., number 7, provides links 26 and 28 between memory operations 4 and 8, enabling the store buffer to execute both 7 and 8.

The WaveCache: A WaveScalar Processor

The design of a WaveCache is a microarchitecture that executes WaveScalar binaries. An exemplary design is the baseline model used in the simulations discussed below.

Execution: Conceptually, WaveScalar assumes that each static instruction in a program binary executes in a separate processing element (PE). Each PE manages operand tag matching for its instruction. When two operands with identical tags arrive at the PE, the instruction executes (this is the dataflow firing rule) and explicitly communicates the result to statically encoded consumer instructions.

Figure 3:
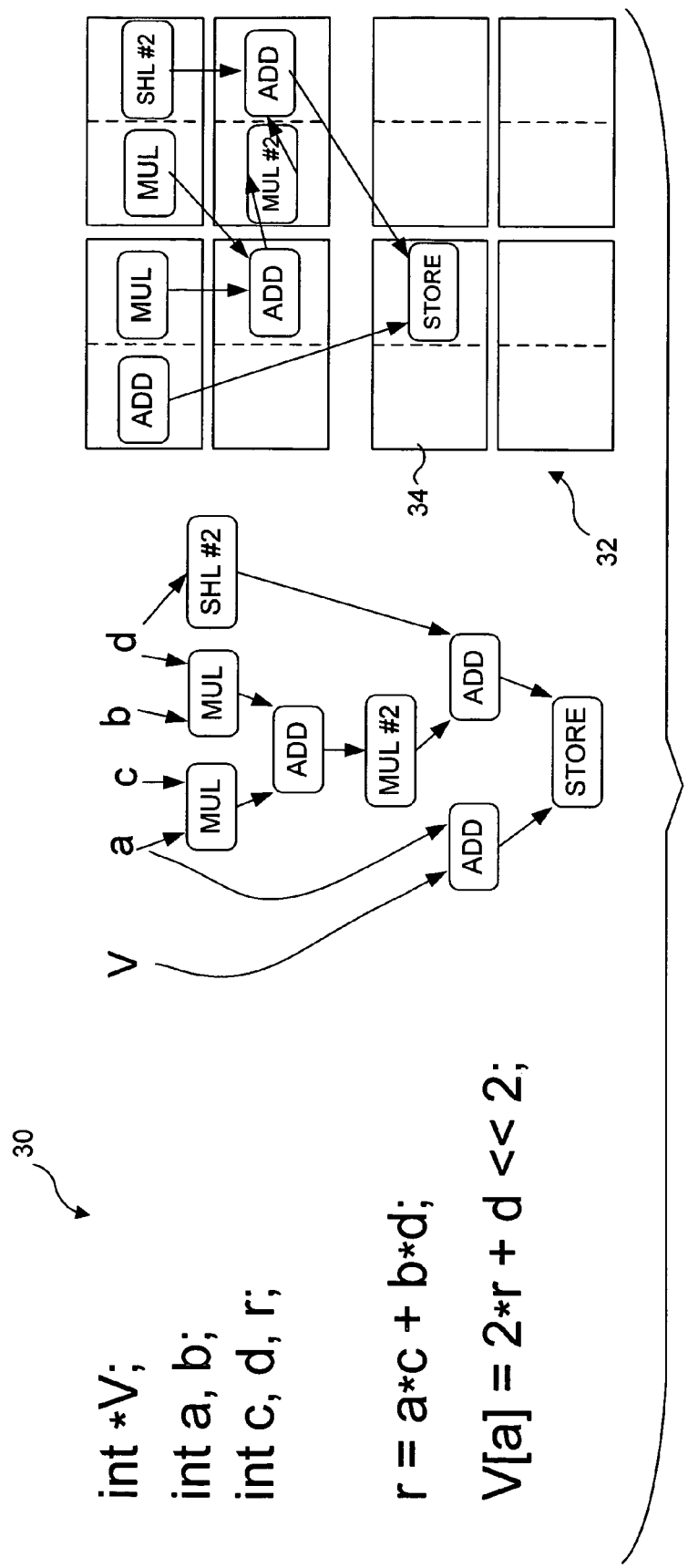
FIG. 3 is a diagram illustrating three views of exemplary code that might be used in WaveScalar, where on the left is illustrated the C code for a simple computation, a corresponding WaveScalar dataflow graph is shown at the center, and the same graph is mapped onto a small patch of the WaveCache substrate at the right of the Figure.

Clearly, building a PE for each static instruction in an application is both impossible and wasteful, so in practice, instructions are dynamically bound to a fixed-size grid of PEs and that are swapped in and out on demand. The PEs cache the working set of the application—hence the name WaveCache. FIG. 3 shows a simple code fragment 30 mapped onto part of a WaveCache 32.

Processor organization: The WaveCache is a grid of simple, five-stage pipelined processing elements. A register transfer level (RTL) model of the design achieves a clock rate of 25 fan out of four (FO4). Each PE contains a functional unit, specialized memories to hold operands, and logic to control instruction execution and communication. A functional unit also contains buffering and storage for several different static instructions, although only one can fire each cycle. Each PE handles tag matching for its own instructions, contributing to the scalability of the WaveCache design.

Figure 2:
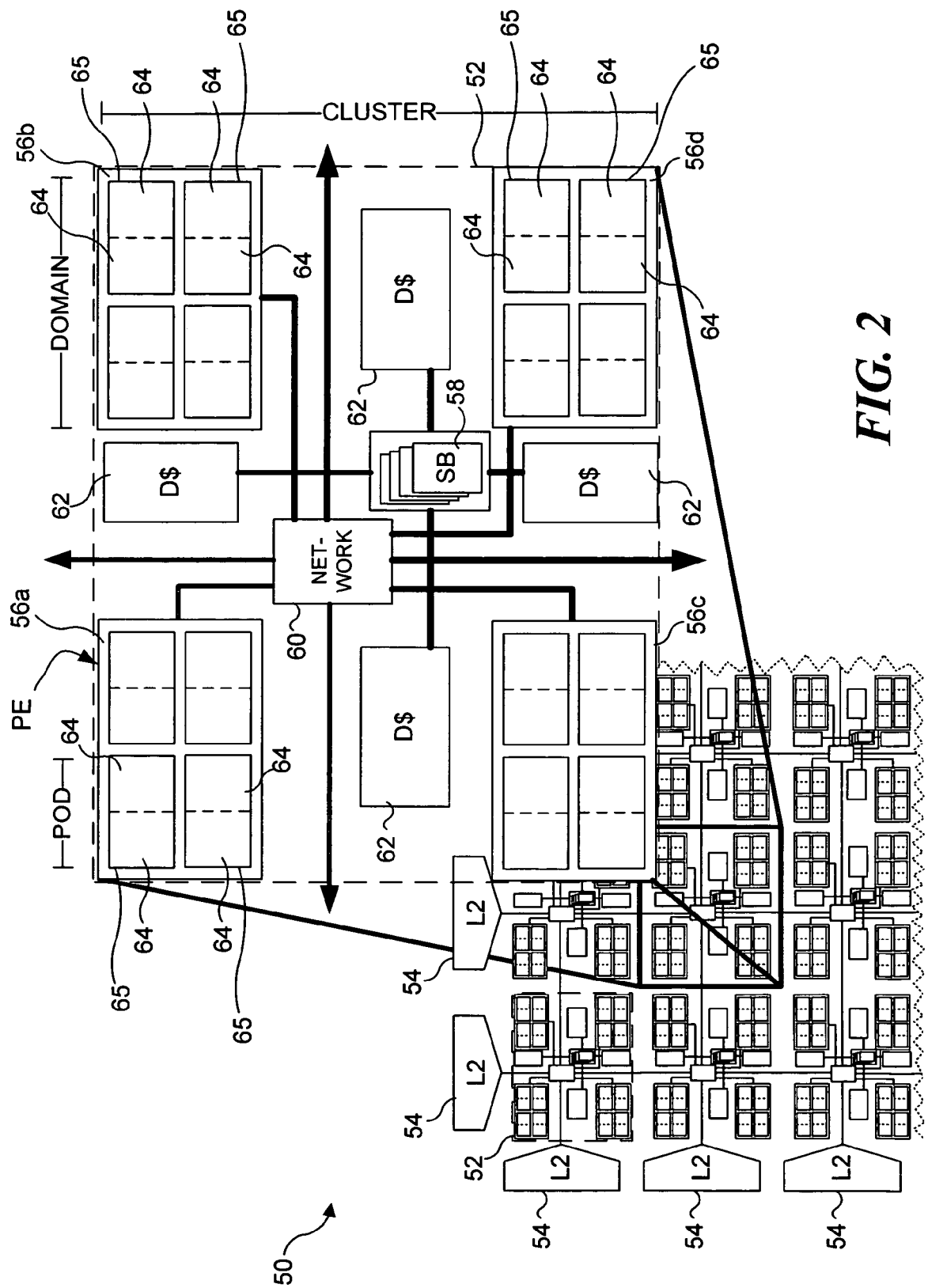
FIG. 2 is a schematic diagram illustrating an exemplary hierarchical organization of the microarchitecture of the WaveCache.

To reduce communication costs within the grid, PEs 64 are organized hierarchically, as depicted in a block diagram 50 in FIG. 2. Two PEs 64 are first coupled, forming a pod 65 that shares operand scheduling and output-to-source bypass logic. Within a pod 65, instructions execute on one PE and their results are sent to the partner PE (of the pod) in a single cycle. Four PE pods 65 comprise one of domains 56a, 56b, 56c, and 56d, within which producer-consumer latency is five cycles. The four domains are then grouped into a cluster 52, which also contains wave-ordered memory hardware and a traditional L1 data cache 62 that is coupled to store buffers 58. A single cluster, combined with an L2 cache 54 and traditional main memory, is sufficient to run any WaveScalar program. To build larger machines, multiple clusters are connected by an on-chip network 60, and cache coherence is maintained by a traditional, directory-based protocol, with multiple readers and a single writer. The coherence directory and the L2 cache are distributed around the edge of the grid of clusters. Table 1 describes the WaveCache configuration discussed herein. Simulations that were executed accurately model contention on all network links and communication busses for operand, memory, and cache coherence traffic. Instruction placement is done on-demand and dynamically snakes instructions across the grid.

TABLE 1

Microarchitectural parameters of exemplary WaveCache

| | | | |
|---|---|---|---|
| WaveCache Capacity | | 131,072 static instructions (64 per PE) | |
| PEs per Domain | 8 (4 pods) | Domains/Cluster | 4 |
| PE Input Queue | 16 entries, 4 banks | Network Latency | within Pod: 1 cycle |
| PE Output Queue | 8 entries, 4 ports (2r, 2w) | | within Domain: 5 cycles |
| PE Pipeline Depth | 5 stages | | within Cluster: 9 cycles |
| | | | inter-Cluster: 9 + Cluster dist. |
| L1 Caches | 32 KB, 4-way set associative, 128 B line, 4 accesses/cycle | L2 Cache | 16 MB shared, 1024 B line, 4-way set associative, 20 cycle access |
| Main RAM | 1000 cycle latency | Network Switch | 4-port, bidirectional |

Wave-ordered memory hardware: The wave-ordered memory hardware is distributed throughout the WaveCache as part of the store buffers. Each cluster contains four store buffers, all accessed through a single port. A dynamic wave is bound to one store buffer, which fields all memory requests for that wave. The store buffer itself is a small memory that holds memory requests. A simple state machine implements the wave-ordered memory logic by "walking" the sequence of requests and stalling when it detects a missing operation. This ensures that memory operations are issued to the L1 data caches in the correct order.

After a wave executes, its store buffer signals the store buffer for the next wave to proceed—analogous to a baton pass in a relay race. This scheme allows all store buffers to remain logically centralized, despite their physically distributed implementation.

The remaining issue lies in assigning store buffers to waves. To accomplish this, a table kept in main memory is used that maps wave numbers to store buffers. Memory instructions send their requests to the nearest store buffer, which accesses the map to determine where the message should go. If the map already has an entry for the current wave, it forwards the message to the appropriate store buffer. If there is no entry, the store buffer atomically updates it with its own location and processes the request.

Coarse-Grain Threads in WaveScalar

As originally developed, the WaveScalar instruction set and WaveCache microarchitecture were capable of executing a single coarse-grain thread of execution. However, in the further development of the architecture that is described herein, support has been added to WaveScalar to simultaneously execute multiple coarse-grain, pthread-style threads. Three additions to the instruction set architecture (ISA) and microarchitecture enable this capability. First, the wave-ordered memory interface was extended to simultaneously support active, independent threads of execution. Second, a lightweight, intrathread synchronization mechanism was introduced that enables WaveScalar to provide an efficient relaxed consistency model of memory. Finally, a low overhead, memoryless synchronization mechanism was introduced that models a hardware queue lock and provides efficient intrathread communication.

Multiple Memory Orderings

As previously introduced, the wave-ordered memory interface provides support for a single memory ordering. Forcing all threads to contend for the same memory interface, even if it were possible, would be detrimental to performance. Consequently, to support multiple threads, the exemplary WaveScalar architecture was extended to allow multiple independent sequences of ordered memory accesses, each of which belongs to a separate thread. First, every data value in a WaveScalar machine was annotated with a THREAD-ID in addition to its WAVE-NUMBER. Then, instructions were introduced to associate memory ordering resources with particular THREAD-IDs. Finally, the necessary changes were made to the WaveCache architecture and the efficiency of the architecture as thus modified was evaluated.

THREAD-IDs: The WaveCache already has a mechanism for distinguishing values and memory requests within a single thread from one another—the values and memory requests are tagged with WAVE-NUMBERs. To differentiate values from different threads, this tag was extended with a THREAD-ID, and WaveScalar's dataflow firing rule was modified to require that operand tags match on both THREAD-ID and WAVE-NUMBER. As with WAVE-NUMBERs, additional instructions were provided to directly manipulate THREAD-IDs. In figures and examples included herein, the notation $<t, w>.d$ signifies a token tagged with THREAD-ID t, and WAVE-NUMBER w, and having a data value d.

To manipulate THREAD-IDs and WAVE-NUMBERs, several instructions were introduced that convert WAVE-NUMBERs and THREAD-IDs to normal data values and back again. The most powerful of these is DATA-TO-THREAD-WAVE, which sets both the THREAD-ID and WAVE-NUMBER at once; DATA-TO-THREAD-WAVE takes three inputs, $<t_0, w_0>.t_1$, $<t_0, w_0>.w_1$, and $<t_0, w_0>.d$ and produces as output $<t_1, w_1>.d$. WaveScalar also provides two instructions (DATA-TO-THREAD and DATA-TO-WAVE) to set THREAD-IDs and WAVE-NUMBERs separately, as well as two instructions (THREAD-TO-DATA and WAVE-TO-DATA) to extract THREAD-IDs and WAVE-NUMBERs.

Managing memory orderings: Having associated a THREAD-ID with each value and memory request, the wave-ordered memory interface was extended to enable programs to associate memory orderings with THREAD-IDs. Two new instructions control the creation and destruction of memory orderings, in essence creating and terminating coarse-grain threads. These two instructions are: MEMORY-SEQUENCE-START and MEMORY-SEQUENCE-STOP.

MEMORY-SEQUENCE-START creates a new wave-ordered memory sequence, often a new thread. This thread is assigned to a store buffer, which services all memory requests tagged with its THREAD-ID and WAVE-NUMBER; requests with the same THREAD-ID but a different WAVE-NUMBER cause a new store buffer to be allocated, as described above.

Figure 4:
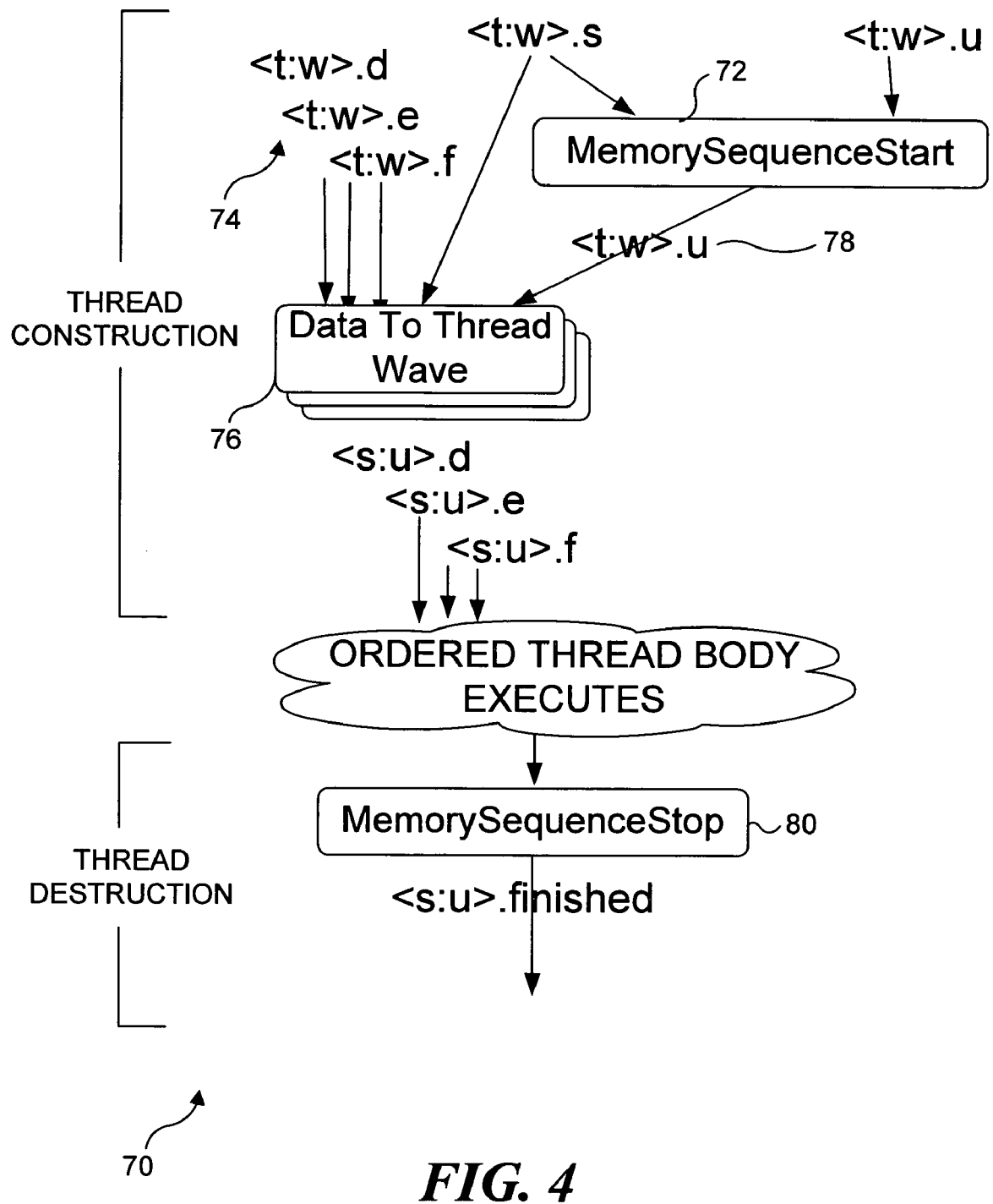
FIG. 4 is a schematic diagram illustrating an example of thread creation and destruction, wherein a thread t spawns a new thread s by sending a THREAD-ID (s) and a WAVE-NUMBER (u) to a MEMORY-SEQUENCE-START command and setting up three input parameters for thread s with three DATA-TOTHREAD-WAVE instructions.

MEMORY-SEQUENCE-STOP terminates a memory ordering sequence. The wave-ordered memory system uses this instruction to ensure that all memory operations in the sequence have completed before the store buffer resources are released. FIG. 4 shows instructions 70 that illustrate how, using these instructions, a thread t creates a new thread s, thread s executes and then terminates. In this example, THREAD-ID (s) and WAVE-NUMBER (u) are supplied to MEMORY-SEQUENCE-START 72, and three input parameters 74 are set up for thread s with three DATA-TO-THREAD WAVE instructions 76. The inputs to each DATA-TO-THREAD WAVE instruction are a parameter value (d, e, or f), the new THREAD-ID (s), and the new WAVE-NUMBER (u). A token 78 with u is deliberately produced by the instruction MEMORY-SEQUENCE-START, to guarantee that no instructions in thread s will execute until MEMORY-SEQUENCE-START has finished allocating store buffer area for s. Thread s terminates with instruction MEMORY-SEQUENCE-STOP 80, whose output token $<s, u>$.finished indicates that its store buffer area has been deallocated.

Implementation: Adding support for multiple memory orderings requires only small changes to the WaveCache's microarchitecture. First, the widths of the communication busses and operand queues must be expanded to hold THREAD-IDs. Second, instead of storing every static instruction from the working set of a program in the WaveCache, one copy of each static instruction is stored for each thread, which means that if two threads are executing the same static instructions, each may map the static instruction to different PEs.

Efficiency: The overhead associated with spawning a thread directly affects the granularity of extractable parallelism. To assess this overhead in the WaveCache, a controlled experiment consisting of a simple parallel loop was designed, in which each iteration executes in a newly spawned thread.

The size of the loop body was varied, which effects the granularity of parallelism, and the dependence distance between memory operands, which effects the number of threads that can execute simultaneously. Speedup compared to a serial execution of a loop doing the same work was then measured. The experiment's goal was to answer the following question. Given a loop body with a critical path length of N instructions and a dependence distance of T iterations (i.e., the ability to execute T iterations in parallel), can execution be speeded up by spawning a new thread for every loop iteration?

Figure 5:
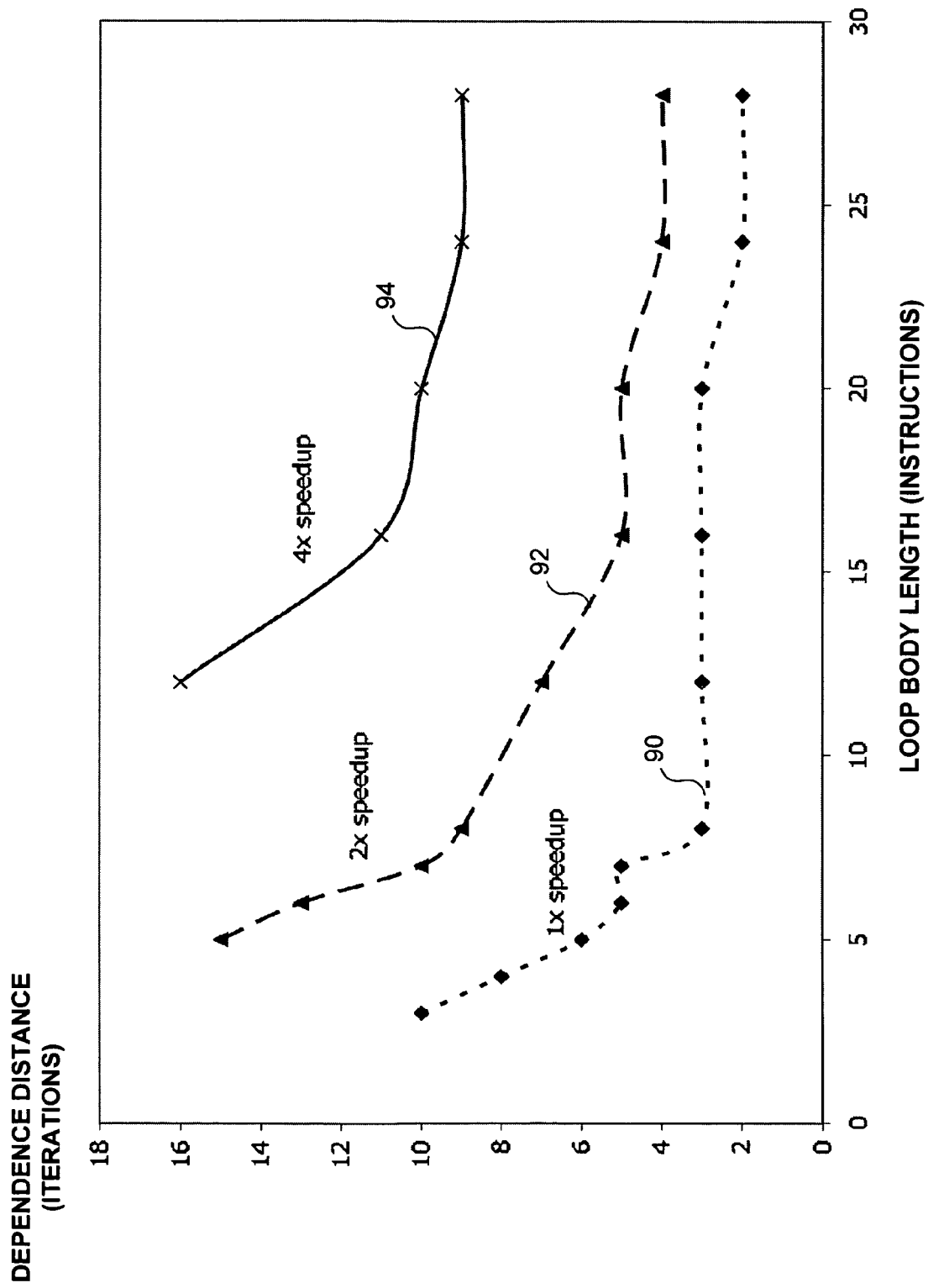
FIG. 5 is a graph showing an exemplary thread creation overhead, with contour lines for speedups of 1× (i.e., no speedup), 2×, and 4×.

FIG. 5 is a contour plot of speedup of the loop as a function of its loop size (critical path length in ADD instructions, the horizontal axis) and dependence distance (independent iterations, the vertical axis). Contour lines 90, 92, and 94 are shown respectively for speedups of 1× (no speedup), 2×, and 4×. The area above each contour line is a region of program speedup that is at or above the labeled value. The data show that the overhead of creating and destroying threads via MEMORY-SEQUENCE-START and MEMORY-SEQUENCE-STOP is so low that for loop bodies of only 24 dependent instructions and a dependence distance of 3, it becomes advantageous to spawn a thread to execute each iteration. A dependence distance of 10 reduces the size of profitably parallelizable loops to only four instructions. Increasing the number of instructions to 20 quadruples performance. (If independent iterations need to make potentially recursive function calls, extra overhead may apply.)

Synchronization

The ability to efficiently create and terminate pthread-style threads, as described in the previous section, provides only part of the functionality required to make multithreading useful. Independent threads must also synchronize and communicate with one another. WaveScalar recognizes two types of synchronization: intrathread and interthread. Intrathread synchronization can be used to build a relaxed consistency model by synchronizing the execution of a thread with its outstanding memory operations. The second primitive models a hardware queue lock and provides interthread synchronization. In the following sections, the mechanisms that support these two forms of synchronization are discussed, followed by an exemplary mutex. (A mutex is a program object that enables multiple program threads to share the same resource, such as file access, but not simultaneously.)

Memory Fence

Wave-ordered memory provides a single thread with a consistent view of memory, since it guarantees that the results of earlier memory operations are visible to later operations. In some situations, such as before taking or releasing a lock, a multithreaded processor must guarantee that the results of a thread's memory operations are visible to other threads. An additional instruction, MEMORY-NOP-ACK, was added to the ISA to provide this assurance, by acting as a memory fence. MEMORY-NOP-ACK prompts the wave-ordered interface to commit the thread's prior loads and stores to memory, thereby ensuring their visibility to other threads and providing WaveScalar with a relaxed consistency model. The interface then returns an acknowledgment, which the thread can use to trigger execution of its subsequent instructions.

Multiprocessors provide a variety of relaxed consistency models. Some, including release consistency (S. V. Adve and K. Gharachorloo, "Shared memory consistency models: A tutorial," IEEE Computer (29,12), 1996) and the model used by the Alpha (see R. L. Sites et al., "Alpha AXP Architecture Reference Manual," Digital Press, second ed., 1995), ensure a consistent view only in the presence of memory barrier instructions. MEMORY-NOP-ACK provides this functionality by forcing a thread's memory operations to memory.

Interthread Synchronization

Most commercially deployed multiprocessors and multithreaded processors provide interthread synchronization through the memory system via primitives such as TEST-AND-SET, COMPARE-AND-SWAP, or LOAD-LOCK/STORE-CONDITIONAL. Some research efforts also propose building complete locking mechanisms in hardware. Such queue locks (for example, A. Kagi et al., "Efficient Synchronization: Let Them Eat QOLB", *International Symposium on Computer Architecture*, 1997 and D. M. Tullsen et al., "Supporting Fine-Grain Synchronization on a Simultaneous Multithreaded Processor", International Symposium on High Performance Computer Architecture, 1999) offer many performance advantages in the presence of high lock contention.

In WaveScalar, support was added for queue locks in a way that constrains neither the number of locks nor the number of threads that may contend for the lock. This support is embodied in a synchronization instruction called THREAD-COORDINATE, which synchronizes two threads by passing a value between them. THREAD-COORDINATE is similar in spirit to other lightweight synchronization primitives, but is tailored to WaveScalar's dataflow framework. Rather than utilize an additional hardware memory and finite state machine to implement it, the tag matching logic used by every PE is exploited to carry out dataflow execution.

FIGS. 6A and 6B respectively illustrate matching rules 96 and 98 required to support THREAD-COORDINATE and how they differ from the matching rules for normal instructions. All WaveScalar instructions except THREAD-COORDINATE fire when the tags of two input values 100 and 102 match and they produce outputs 104 with the same tag (FIG. 6A). For example, in these Figures, both input tokens 100 and 102, and result 104 have a THREAD-ID, $t_0$, and a WAVE-NUMBER, $w_0$.

In contrast, THREAD-COORDINATE fires when the data value of a token at its first input matches the THREAD-ID of a token at its second input. This condition is depicted in FIG. 6B, where the data value of the left input token and the thread value of the right input token are both $t_1$. The THREAD-COORDINATE generates an output token with the THREAD-ID and WAVE-NUMBER from the first input and the data value from the second input. In FIG. 6B, this condition produces an output $<t_0:w_0>.d$. In essence, THREAD-COORDINATE passes the second input's value (d) to the thread of the first input ($t_0$). Since the two inputs come from different threads, this forces the receiving thread ($t_0$ in this case) to wait for a message from the sending thread ($t_1$) before continuing execution.

Although it is possible to implement many kinds of synchronization objects using THREAD-COORDINATE, for brevity, an example 120 in FIG. 7 only illustrates how THREAD-COORDINATE is used to construct a mutex. In this case, THREAD-COORDINATE is the vehicle by which a thread releasing a mutex passes control to another thread wishing to acquire control of the mutex.

The mutex in FIG. 7 is represented by a THREAD-ID, $t_m$, although it is not a thread in the usual sense; instead, $t_m$'s sole function is to uniquely name the mutex. A thread $t_1$ that has locked mutex $t_m$ releases it in two steps (as shown on the right side of FIG. 7). First, $t_1$ ensures that the memory operations it executed inside the critical section have completed by executing a MEMORY-NOP-ACK 122. Then, $t_1$ uses a DATA-TO-THREAD instruction 124 to create the token $<t_m, u>.t_m$ which it sends to the second input port of THREAD-COORDINATE, thereby releasing the mutex.

This token waits at THREAD-COORDINATE's second input port until another thread, to in the Figure, attempts to acquire the mutex. When this happens, $t_0$ sends a token $<t_0, w>.t_m$ (whose datum is the mutex) to THREAD-COORDINATE. By the rules discussed above, this token matches that sent by $t_1$, causing THREAD-COORDINATE to produce a token $<t_0, w>.t_m$. If all instructions in the critical section guarded by mutex $t_m$ depend on this output token (directly or via a chain of data dependencies), thread $t_0$ cannot execute the critical section until THREAD-COORDINATE produces it.

Splash-2

WaveScalar's multithreading facilities were evaluated by executing coarse-grain, multithreaded applications from the Splash-2 benchmark suite (Table 2). The toolchain and simulator described were used for this evaluation. An 8×8 array of clusters was simulated to model an aggressive, future-generation design. Using the results from the RTL model described above, but scaled to 45 nm, it is estimated that the processor occupies about 290 mm², with an on-chip 16 MB L2 cache.

TABLE 2

Splash-2 Benchmarks and Their Parameters Used in Study

| Benchmark | Parameters |
|---|---|
| fft | -m12 |
| lu | -n128 |
| radix | -n16384 -r32 |
| ocean-noncont | -n18 |
| water-spatial | 64 molecules |

After skipping past initialization, execution of the parallel phases of the benchmarks were measured. The performance metric is execution-time speedup relative to a single thread executing on the same WaveCache. The WaveScalar speedups were also compared to those calculated by other researchers for other threaded architectures. Component metrics help explain these bottom-line results, where appropriate.

Evaluation of A Multithreaded WaveCache

FIG. 8 illustrates speedups of multithreaded WaveCaches for all six benchmarks, as compared to their single-threaded running time. On average, the WaveCache achieved near-linear speedup (27×) for up to 32 threads. Average performance still increases with 128 threads, but sublinearly, up to 47× speedup with an average IPC of 88.

Interestingly, increasing beyond 64 threads for ocean and raytrace reduces performance, because of WaveCache congestion from their larger instruction working sets and L1 data evictions due to capacity misses. For example, going from 64 to 128 threads, ocean suffered 18% more WaveCache instruction misses than would be expected from the additional compulsory misses. In addition, the matching cache (used to match operand values for execution) miss rate increased by 23%. Finally, the data cache miss rate, which is essentially constant for up to 32 threads, doubles as the number of threads scales to 128. This additional pressure on the memory system increases ocean's memory access latency by a factor of eleven.

The same factors that caused the performance of ocean and raytrace to suffer when the number of threads exceeded 64 also reduced the rate of speedup improvement for other applications as the number of threads increased. For example, the WaveCache instruction miss rate quadrupled for lu when the number of threads dedicated to the computation increased from 64 to 128, curbing speedup. In contrast, FFT, with its relatively small per-thread working set of instructions and data, did not tax these resources, and so achieved better speedup with up to 128 threads.

Comparison to Other Threaded Architectures

The performance of the WaveCache and a few other architectures were performed on three Splash-2 kernels: lu, fft and radix. Results from several sources are presented, in addition to the WaveCache simulator results. For CMP configurations, experiments were performed using a simple in-order core (scmp), and appropriate measurements were made. Comparing data from such diverse sources is difficult, and drawing precise conclusions about the results is hard; however, it is believed that the measurements are still valuable for the broad trends they reveal.

To make the comparison as equitable as possible, a smaller, 4×4 WaveCache was used for these studies. The RTL model gives an area of 253 mm² for this design (assuming an off-chip, 16MB L2 cache, and increasing its access time from 10 to 20 cycles). While a precise area measurement was not available for the other architectures, the most aggressive configurations (i.e., most cores or functional units) are in the same ball park with respect to size.

To facilitate the comparison of performance numbers of these different sources, all performance numbers were normalized to the performance of a simulated scalar processor with a 5-stage pipeline. The processor has 16 KB data and instruction caches, and a 1 MB L2 cache, all 4-way set associative. The L2 hit latency is 12 cycles, and the memory access latency of 200 cycles matches that of the WaveCache.

FIG. 9 shows the results of the evaluation. The stacked bars in this Figure represent the increase in performance contributed by executing with more threads. The bars labeled ws depict the performance of the WaveCache. The bars labeled scmp represent the performance of a CMP whose cores are the scalar processors described above. These processors are connected via a shared bus between private L1 caches and a shared L2 cache. Memory is sequentially consistent, and coherence is maintained by a 4-state snoopy protocol. Up to four accesses to the shared memory may overlap. For the CMPs, the stacked bars represent increased performance from simulating more processor cores. The 4- and 8-stack bars loosely model Hydra and a single Piranha chip, respectively.

The bars labeled smt8, cmp4, and cmp2 are the 8-threaded SMT and 4- and 2-core out-of-order CMPs. Their running times were extracted from data provided by the authors. Memory latency is low on these systems (dozens of cycles) compared to expected future latencies, and all configurations share the L1 data- and instruction caches.

To compare the results (labeled ekman in the Figure), which are normalized to the performance of their 2-core CMP, a superscalar with a configuration similar to one of these cores was simulated and the reported execution time was halved; this figure was then used as an estimate of absolute baseline performance. In the reference document, the authors fixed the execution resources for all configurations, and partitioned them among an increasing number of decreasingly wide CMP cores. For example, the 2-thread component of the ekman bars is the performance of a 2-core CMP in which each core has a fetch width of 8, while the 16-thread component represents the performance of 16 cores with a fetch-width of 1. Latency to main memory is 384 cycles, and latency to the L2 cache is 12 cycles.

The graph shows that the WaveCache can handily outperform the other architectures at high thread counts. It executes 4.4× to 18× faster than scmp, 5.8× to 18× faster than smt8, and 10× to 20× faster than the various out-of-order CMP configurations. Component metrics show that the WaveCache's performance benefits arise from its use of point-to-point communication, rather than a system-wide broadcast mechanism, and from the latency-tolerance of its dataflow execution model. The former enables scaling to large numbers of clusters and threads, while the latter helps mask the increased memory latency incurred by the directory protocol and the high load-use penalty on the L1 data cache.

The performance of all systems eventually plateaus when some bottleneck resource saturates. For scmp this resource is shared L1 bus bandwidth. Bus saturation occurs at 16 processors for LU, 8 for FFT and 2 for RADIX 4. For the other von Neumann CMP systems, the fixed allocation of execution resources is the limit, resulting in a decrease in per-processor IPC. For example, in ekman, per-processor IPC drops 50% as the number of processors increases from 4 to 16 for RADIX and FFT. On the WaveCache, speedup plateaus when the working set of all the threads equals its instruction capacity, which offers WaveCache the opportunity to tune the number of threads to the amount of on-chip resources. With their static partitioning of execution resources across processors, this option is absent for CMPs; and the monolithic nature of SMT architectures prevents scaling to large numbers of thread contexts.

Visual View of WaveCache Execution

Discussion

The WaveScalar architecture has been further extended to support multiple pthread-style threads by providing support for creating and destroying memory orderings and memoryless synchronization. The result is an efficient threading system that allows multiple coarse-grain threads to execute on a dataflow machine. The mechanisms are lightweight enough that programmers can also use them to express very fine-grain, loop-level parallelism.

Given the mechanisms described above, it is natural to think of a wave-ordered memory sequence as the essence of a thread, because in most systems the notion of a thread and its memory ordering are inseparable. But in WaveScalar, this perspective is misleading: nothing in the WaveScalar architecture requires a thread to have a memory ordering. If a thread could access memory without interacting with the wave-ordered memory system, it could avoid the serialization bottleneck that a global memory ordering requires. In the next section, an interface to memory is described that avoids the wave-ordered memory system and shows that, combined with fine-grain multithreading, WaveScalar can provide substantial benefits for applications where a global ordering of memory operations is not necessary for correct execution.

Fine-Grain, Unordered Threads

As discussed above, extensions have been provided to the WaveScalar instruction set that enable the WaveCache to execute multiple coarse-grain, pthread-style threads simultaneously. The keys to this were extending WaveScalar's tags with THREAD-IDs, providing lightweight memoryless synchronization primitives, and adding management instructions to start and stop ordered memory sequences. The ability to stop a memory ordering sequence begs the question, "What if a thread does not have an ordered memory interface at all?" Without an ordered memory interface, WaveScalar threads can execute their memory operations in any order, potentially exposing massive amounts of parallelism. Such threads are referred to herein as fine-grain, unordered threads.

The following section develops the notion of fine-grain, unordered threads, describes how they can coexist with the coarse-grain threads discussed above, and uses them to implement and evaluate three simple kernels. The fine-grain, unordered implementations are up to 9× faster than coarse-grain threaded versions.

Unordered Memory

As described, WaveScalar's original instruction set allows a thread to execute without a memory ordering only if the thread does not access memory. These threads would be more useful if they could safely read and write the same memory used by threads that utilize wave-ordered memory. Then, the coarse-grain threads from the previous section and the new fine-grain, unordered threads could share data through memory.

WaveScalar has been provided with a new, unordered interface to memory. This interface does not require a thread to give up all control over the order in which memory instructions execute. Instead, it allows the thread to directly control which memory operations can fire in any order and which must be sequentialized.

To illustrate how WaveScalar accomplishes this, consider a store and a load that could potentially access the same address. If, for correct execution, the load must see the value written by the store (i.e., a read-after-write dependence), then the thread must ensure that the load does not execute until the store has finished. In threads that use wave-ordered memory, the store buffer enforces this constraint; however, since they bypass wave-ordered memory, unordered threads must have a different mechanism.

Dataflow instruction sets like WaveScalar ensure that one instruction executes after another by establishing a data dependence between them. (In the above example, this relationship means that the load instruction must be data-dependent on the store.) For this technique to work, memory operations must produce an output token that can be passed to the operations that follow. Loads already do this, because they return a value from memory. However, stores are modified in the present approach, to produce a value when they complete.

In addition, the unordered instructions do not carry wave-ordering annotations and bypass the store buffers, accessing the L1 data caches directly. To differentiate the unordered memory operations from their wave-ordered counter-parts, two unordered operations STORE-UNORDERED-ACK and LOAD-UNORDERED are introduced.

Performance Evaluation

To demonstrate the potential of unordered memory in this context, three traditionally parallel but memory-intensive kernels—matrix multiply (MMUL), longest common subsequence (LCS), and a finite input response (FIR) filter—in three different styles and their performance was compared. Serial coarse grain uses a single thread written in C. Parallel coarse grain is a coarse-grain parallelized version, also written in C, that uses the coarse-grain threading mechanisms described above. Unordered uses a single coarse-grain thread written in C to control a pool of fine-grain, unordered threads, written in WaveScalar assembly.

For each application, the number of threads and the array tile size were tuned to achieve the best performance possible for a particular implementation. MMUL multiplies 128×128 entry matrices, LCS compares strings of 1024 characters, and FIR filters 8192 inputs with 256 taps. Each version is run to completion.

FIGS. 10 and 11 depict the performance of each algorithm executing on the WaveCache. FIG. 10 shows speedup over the serial implementation, and FIG. 11 illustrates average units of work completed per cycle. For MMUL and FIR, the unit of work selected is a multiply-accumulate, while for LCS, it is a character comparison. Application-specific performance metrics were used for this comparison, because they are more informative than IPC when comparing the three implementations.

For all three kernels, the unordered implementations achieve superior performance by exploiting more parallelism. Using unordered memory eliminates false dependencies, enabling more memory operations to execute in parallel. In addition, bypassing the wave-ordering mechanisms reduces contention for limited store buffer resources. The consequence is a 32-1000× increase in the number of simultaneously executing threads.

As a result, the fine-grain implementation of MMUL completes 27 memory operations per cycle as compared to 17 per cycle for the coarse-grain implementation.

Multigranular Threading

The extensions to WaveScalar that support coarse-grain, pthread-style threads were explained above. In the previous section, two lightweight memory instructions were introduced that enable fine-grain, unordered threads. In this section, these two models are combined. The result is a hybrid programming model that enables coarse- and fine-grain threads to coexist in the same application. Two examples that illustrate how ordered and unordered memory operations can be used together are discussed below. Then, the discussion indicates how all of the threading techniques are exploited to improve the performance of Spec2000's equake by a factor of nine.

Mixing Ordered and Unordered Memory

A key strength of the ordered and unordered memory mechanisms is their ability to coexist in the same application. Sections of an application that have independent and easily analyzable memory access patterns (e.g., matrix manipulations and stream processing) can use the unordered interface, while difficult to analyze portions (e.g., pointer-chasing codes) can use wave-ordered memory. The following takes a detailed look at how this feature is achieved.

Two embodiments are described to combine ordered and unordered memory accesses. The first turns off wave-ordered memory, uses the unordered interface, and then reinstates wave-ordering. The second, more flexible approach, allows the ordered and unordered interfaces to exist simultaneously.

EXAMPLE 1

FIG. 12 shows a code sequence 140 that transitions from wave-ordered memory 142 to unordered memory 144 and back again, to ordered memory 146. The process is quite similar to terminating and restarting a pthread-style thread. At the end of the ordered code, a THREAD-TO-DATA instruction extracts the current THREAD-ID, and a MEMORY-SEQUENCE-STOP instruction terminates the current memory ordering. MEMORY-SEQUENCE-STOP outputs a value, labeled finished in the figure, after all preceding wave-ordered memory operations have completed. The finished token triggers the dependent, unordered memory operations, ensuring that they do not execute until the earlier, ordered-memory accesses have completed.

After the unordered portion has executed, a MEMORY-SEQUENCE-START creates a new, ordered memory sequence using the THREAD-ID extracted previously. In principle, the new thread need not have the same THREAD-ID as the original ordered thread. In practice, however, this technique is convenient, because it allows values to flow directly from the first ordered section to the second (the curved arcs on the left side of the figure) without THREAD-ID manipulation instructions.

EXAMPLE 2

In many cases, a compiler may be unable to determine the targets of some memory operations. The wave-ordered memory interface must remain intact to handle these hard-to-analyze accesses. Meanwhile, unordered memory accesses to analyzable operations will simply bypass the wave-ordering interface. This approach allows the two memory interfaces to coexist in the same thread.

FIG. 13 shows how MEMORY-NOP-ACK instructions enable programs to take advantage of this technique. In a function foo 154, the loads and stores that copy *v into t can execute in parallel, but must wait for the store to p, which could point to any address. Likewise, the load from address q cannot proceed until the copy is complete. The wave-ordered memory system guarantees that the store to p, two MEMORY-NOP-ACKS 150 and 152, and the load from q fire in the order shown (top to bottom). The data dependencies between first MEMORY-NOP-ACK 150 and the unordered loads at the left of the Figure ensure that the copy occurs after the first store. An add instruction 156 simply coalesces the outputs from the two STORE-UNORDERED-ACK instructions 158 and 160 into a trigger for the second MEMORY-NOP-ACK that ensures the copy is complete before the final load.

A Detailed Example: Equake

To demonstrate that mixing the two threading styles is not only possible but also profitable, we optimized equake from the SPEC2000 benchmark suite. Equake spends most of its time in the function smvp, with the bulk of the remainder confined to a single loop in the program's main function. In the discussion below, this loop is referenced in main as sim.

Both ordered, coarse-grain and unordered, fine-grain threads are exploited in equake. The key loops in sim are data independent, so they are parallelized, using coarse-grain threads that process a work queue of blocks of iterations. This optimization improves equake's overall performance by a factor of about 1.6.

Next, the unordered memory interface is used to exploit fine-grain parallelism in smvp. Two opportunities present themselves. First, each iteration of smvp's nested loops loads data from several arrays. Since these arrays are read-only, unordered loads are used to bypass wave-ordered memory, allowing loads from several iterations to execute in parallel. Second, a set of irregular cross-iteration dependencies in smvp's inner loop that are caused by updating an array of sums are targeted. These cross-iteration dependencies make it difficult to profitably coarse-grain-parallelize the loop. However, the THREAD-COORDINATE instruction lets fine-grain parallelism be extracted despite these dependencies, since it passes array elements from PE to PE and guarantees that only one thread can hold a particular value at a time. This idiom is inspired by M-structures, a dataflow-style memory element (P. S. Barth et al., "M-structures: extending a parallel, non-strict, functional language with state," in Conference on Functional Programming Languages and Computer Architecture, 1991). Rewriting smvp with unordered memory and M-structures improves overall performance by a factor of 7.9.

When both coarse-grain and fine-grain threading are used together, equake speeds up by a factor of 9.0, which demonstrates that the coarse-grain, pthread-style threads can be used with fine-grain, unordered threads to accelerate a single application.

Exemplary Design Implementation

To explore WaveScalar's true area requirements and performance, a synthesizable pipelined RTL model of the WaveScalar microarchitecture, called the WaveCache, was built. This model synthesizes with a Taiwan Semiconductor Manufacturing Company (TSMC) 90 nm standard cell process. It contains four major components: pipelined processing elements, a pipelined memory interface, a multi-hop network switch and a distributed data cache. These pieces comprise the cluster, which is the basic unit of the WaveCache microarchitecture. Clusters are replicated across the silicon die to form the processing chip.

In the process of going from a paper design to a synthesizable RTL model, a large number of design options were explored to meet area, clock cycle, and instructions-per-clock performance targets. Where appropriate, results from the cycle-level simulator that illustrate the application performance trade-offs are discussed below.

By making the proper engineering trade-offs and developing innovations in the RTL implementation, it was shown that a high performance WaveCache can be built in current generation 90 nm process technology. The processor requires 252 mm² of silicon area. The tools that were used predicted a clock rate of 20.3 FO4 for the execution core and 25 FO4 for the memory interface, leading to a final processor clock of 25 FO4. This clock rate was achieved through aggressively pipelining the microarchitecture. While longer than carefully tuned commercial desktop processors, it is faster than other prototypes typically created in academic settings that use similar tools and design flows.

Synthesizable Model

The synthesizable model that was used is written in Verilog. The Synopsys DesignCompiler™ and DesignCompiler Ultra™ were used for logical synthesis. The model integrates several Veilog™ IP models for critical components, such as SRAM cells, arbiters, and functional units.

ASIC design flow: The design rules for manufacturing devices have undergone dramatic changes at and below the 130 nm technology node. Issues such as crosstalk, leakage current, and wire delay have required synthesis tool manufacturers to upgrade their infrastructures. The changes have also made it more difficult to draw reliable conclusions from scaling down designs done in larger processes. The data presented below was derived with the design rules and the recommended tool infrastructure of the TSMC Reference Flow 4.0 specification, which is tuned for 130 nm and smaller designs. By using these up-to-date specifications, it was insured, as best as possible, that the results scale to future technology nodes.

As noted by TSMC, designs at and below 130 nm are extremely sensitive to placement and routing. Therefore, TSMC recommends against using the delay numbers that are produced after logical synthesis. Instead, it is recommended that the generated netlist be input into Cadence Encounter™ for floor planning and placement, and that Cadence Nano-Route™ be employed for routing. These suggestions were followed. After routing and RC extraction, the timing and area values were recorded. When necessary, the design was fed back into DesignCompiler along with the updated timing information, to recompile the design. The area values presented here include the overhead from incomplete core utilization.

Standard cell libraries: This design uses the standard cell libraries from the TSMC 90 nm process. The 90 nm process is the most current process available, and hence, represents the best target for extracting meaningful synthesis data. The cell libraries contain all of the logical components necessary for synthesis in both low-power and high-performance configurations. For this study the high-performance cells were exclusively used for all parts of the design, although portions of the design that are not timing critical should later be reimplemented with the low-power cells to reduce power consumption.

The memory in the design is a mixture of SRAM memories generated from a commercial memory compiler—used for the large memory structures, such as data caches—and Synopsys DesignWare™ IP memory building blocks—used for the other, smaller memory structures. The characteristics (size, delay, etc) of the memory compiler have been explored by others.

Timing data: Architects prefer to evaluate clock cycle time in a process-independent metric, fan-out-of-four (FO4). The benefit of using this metric is that the cycle time in FO4 does not change (much) as the process changes. Thus a more direct comparison of designs can be performed.

Synthesis tools, however, report delay in absolute terms (nanoseconds). To report timing data in FO4, the common academic practice of synthesizing a ring oscillator to measure FO1 and then multiplying this delay by 3 was followed. An oscillator was built using the same design flow and standard cells as used in the rest of the design, and an FO1 of 16.73 ps was measured, which results in an FO4 of 50.2 ps. All timing data presented in this paper are reported in F04 based upon this measurement.

Cycle-Level Functional Simulation

In connection with the Verilog RTL model, a corresponding cycle-accurate, instruction-level simulator was built. The simulator models each major subsystem of the WaveCache (execution, memory, and network) and has been used to explore many aspects in more detail. It also serves to answer basic questions, such as sizing of microarchitecture features and performance impact of contention effects, that arise from the actual design. To drive the simulations, a suite of applications was executed, as described herein. These applications were compiled with the DEC Alpha CC compiler and then binary translated into WaveCache assembly. These assembly files were compiled with the WaveScalar assembler and these executables were used by the simulator.

Microarchitecture: From a programmer's perspective, every static instruction in a program binary has a dedicated PE. Clearly, building so many PEs is impractical and wasteful, so, in practice, multiple instructions are dynamically bound to a fixed number of PEs that are swapped in and out on demand. Thus, the PEs cache the working set of the application; hence, the microarchitecture that executes WaveScalar binaries is called a WaveCache. As discussed above, FIG. 3 illustrates how a WaveScalar program 30 on the left side of the Figure can be mapped into a WaveCache 32. The conflicting goals of the instruction mapping algorithm (which maps dynamically as the program executes) are to place dependent instructions near each other to minimize producer-consumer latency, and to spread independent instructions out in order to utilize resources and exploit parallelism.

Each PE 34 in FIG. 3 contains a functional unit, specialized memories to hold operands, and logic to control instruction execution and communication. Each PE also contains buffering and storage for several different static instructions. The PE has a five-stage pipeline, with bypass networks allowing back-to-back execution of dependent instructions at the same PE. Two aspects of the design warrant special notice. First, it avoids a large centralized, associative tag matching store, found on some previous dataflow machines. Second, although PEs dynamically schedule execution, the scheduling hardware is dramatically simpler than a conventional dynamically scheduled processor. The PE design is described in detail below.

To reduce communication costs within the grid, PEs are organized hierarchically, as shown in FIG. 2 and as described above. PEs are coupled into pods; within a pod 65, PEs snoop each other's result networks and share scheduling information. These pods are further grouped into domains; within each domain, PEs communicate over a set of pipelined busses. Four domains form each cluster 52, which also contains wave-ordered memory hardware (in store buffers 58), network switch 60, and L1 data cache 62, as noted above.

The baseline design: The exemplary RTL-level model described herein is a 4×4 array of 16 clusters, each containing a total of 16 pods (32 PEs), arranged 4 per domain. In the 90 nm process, each cluster occupies 16 mm$^2$, yielding a 263 mm$^2$ WaveCache.

The next three sections describe the exemplary RTL model of a WaveCache processor comprising 16 clusters in a 4×4 grid, as noted above in connection with Table 1. During the design of this model, many design options were considered, and choices were made based on the effect they had on delay, area, and application performance.

Processing Elements (PEs)

The WaveCache contains the same overall structures as all computing devices, namely execution, interconnect, and memory resources. Its microarchitecture is presented using this organization, to give a context in which to view each type of resource. This section focuses on the execution resources.

The execution resources of the WaveCache are comprised of hundreds of pipelined PEs. The following discussion explains the microarchitecture of the PEs by first describing their function and providing a broad overview of their pipeline stages. An example is presented below that traces the execution of a short sequence of instructions through a pipeline. Following this example, each pipeline stage is described in detail.

A PE's Function

At a high level, the structure of a PE pipeline resembles a conventional five-stage, dynamically scheduled execution pipeline. The greatest difference between the two is that the PE's execution is entirely data-driven. Instead of executing instructions provided by a program counter, as would occur on von Neumann machines, values arrive at a PE destined for use by a particular instruction. These values trigger execution—the essence of dataflow execution. A pre-decoded instruction is fetched from a local instruction store in the PE and, when all instruction inputs are available, the instruction executes and sends its result to trigger the execution of other instructions.

The five pipeline stages of a PE are:
1. INPUT: Operand messages arrive at the PE either from another PE or from itself. The PE may reject messages if too many arrive in one cycle; the senders will then retry on a later cycle.
2. MATCH: Operands enter the operand matching table. The matching table determines which instructions are now ready to fire, and issues eligible instructions by placing their matching table index into the instruction scheduling queue.
3. DISPATCH: The PE selects an instruction from the scheduling queue, reads its operands from the matching table and forwards them to EXECUTE. If the destination of the dispatched instruction is local, this stage speculatively issues the consumer instruction to the scheduling queue.
4. EXECUTE: An instruction executes. Its result goes to the output queue and/or to the local bypass network.
5. OUTPUT: Instruction outputs are sent via the output bus to their consumer instructions, either at this PE or a remote PE.

The pipeline design includes bypass paths that enable program flow to move from the end of execution directly to the beginning of execution of an instruction. This bypass network, combined with hardware scheduling, enables back-to-back execution of dependent instructions.

FIG. 14 illustrates how instructions from a simple dataflow graph 161 flow through a pipeline 162 and how their execution affects a matching table 164 and a scheduling queue 166. This Figure also illustrates how the bypass network allows two instructions A and B to execute on consecutive cycles. In this sequence, A's result is forwarded to B when B is in EXECUTE. In the diagram, X[n] is the nth input to instruction X. Five consecutive cycles 168a, 168b, 168c, 168d, and 168e are depicted; before the first of these, cycle 168a, one input each from instructions A and B have arrived and reside in matching table 164. "Clouds 170" in the dataflow graph represent results of instructions at other processing elements, which have arrived from the input network.

Cycle 0: Operands A[0] arrives and INPUT accepts it.

Cycle 1: MATCH writes A[0] into the matching table and, because both its inputs are now available, places a pointer to A's entry in matching table 164 into scheduling queue 166.

Cycle 2: DISPATCH chooses A for execution, reads its operands and sends them to EXECUTE. At the same time, it recognizes that A's output is destined for B; in preparation for this producer-consumer handoff, a pointer to B's matching table entry is inserted into the scheduling queue.

Cycle 3: DISPATCH reads B[0] from the matching table and sends it to EXECUTE. EXECUTE computes the result of A, which is B[1].

Cycle 4: EXECUTE computes the result of instruction B using B[0] and the result from the bypass network.

Cycle 5 (not shown): OUTPUT will send B's output to Z.

This example serves to illustrate the basic mechanics of PE operation. Each stage is next described in detail, as well as the design trade-offs involved in each.

Input

At each cycle, INPUT monitors the incoming operand busses. In the exemplary RTL model, there are 10 busses: one is the PE's output bus, seven originate from other PEs in the same domain, one is the network bus, and one is the memory interface. INPUT will accept inputs from up to four of these busses each cycle. If more than four arrive during one cycle, an arbiter selects among them; rejected inputs are retransmitted by their senders. Four inputs is a reasonable balance between performance and design complexity/area. Due to the banked nature of the matching table (see below), reducing the number of inputs to three was found to have no practical area-delay benefit. Two inputs, however, reduced application performance by 5% on average, but by 15-17% for some applications (ammp and fir). Doubling the number of inputs to eight increased performance by less than 1% on average.

As noted above, WaveScalar is a tagged token dataflow machine, which means all data values carry a tag that differentiates dynamic instances of the same value. Tags in WaveScalar are comprised of two fields: a THREAD-ID and a WAVE-NUMBER. Since each PE can hold multiple static instructions, messages on the busses also carry a destination instruction number. INPUT computes a simple XOR hash of the THREAD-ID, WAVE-NUMBER, and destination instruction number for each operand, which is used to index the matching table. INPUT then places the (up to four) operands it has selected, along with their hashes, into its pipeline register for MATCH to process in the next clock cycle.

Neglecting domain wiring overhead, which will be accounted for below, INPUT's actual logic consumes 8.3% (0.03 mm$^2$) of the PE's area. It achieves a clock rate of 13.7 FO4 in isolation, which is significantly shorter than the other stages. However, the rest of the clock period is taken up by delay in the intra-domain interconnect.

Match

The next two pipeline stages comprise the operand tag matching and instruction dispatch logic. Implementing these operations cost-effectively is essential to an efficient dataflow design and has historically been an impediment to more effective dataflow execution. The key challenge in designing the WaveCache matching table is emulating a potentially infinite table with a much smaller physical structure. This problem arises because WaveScalar is a dynamic dataflow architecture, and places no limit on the number of dynamic instances of a static instruction with unconsumed inputs.

To address this challenge, the matching table is a specialized cache for a larger in-memory matching table, a common dataflow technique. MATCH writes operands into the matching table, and DISPATCH reads them out. The table is separated into three columns, one for each potential instruction input. Associated with the matching table is a tracker board, which holds the operand tag, consumer instruction number, presence bits which denote which operands have arrived, and a pin bit which indicates which instructions have all of their operands and are ready to execute.

When new operands arrive from INPUT, the PE attempts to store each of them in the matching table, using the hash as the index. For each operand, there are four possibilities: (1) an operand with the same tag has already arrived, so there is a space waiting for it in the matching table; (2) no other operands with the same tag have arrived, and the line is unoccupied, and in this case, MATCH allocates the line to the new operand and updates the tracker board; (3) the line is occupied by the operands for another instruction, and in this case, the PE rejects the message and waits for the sender to retry; after several retries, operands resident in the matching table are evicted to memory, and the newly empty line is allocated to the new operand; and, (4) the line is occupied by the operands for another instruction which is pinned to the matching table, which occurs when the instruction is ready to, but has not yet executed; as in case (3), the message is rejected and will be resent, and after four retries the new operand is written to memory. Scenarios (3) and (4) are matching tables misses.

In parallel with updating the matching table, MATCH checks the presence bits to see if any of the operands that arrived in INPUT were the last ones needed to allow an instruction to execute. If this is the case, MATCH pins the corresponding line in place and adds its matching table index and tag to the scheduling queue (described below, in the next section).

While the average occupancy of the matching table is low, it was found to be critical to have at least 16 entries to handle bursty behavior. Reducing the number of entries to eight dropped performance on average by 23%. Doubling to 32 added almost no gain to applications written in C, but increased performance on fine-grained dataflow kernels by 36%. Because this configuration consumes substantially more area (see below) and provides limited improvement on C-based applications, 16 entries were chosen for the exemplary RTL implementation. This application-class variation, however, suggests that designers will want to tune this parameter, depending on the target market.

Since the matching table is a cache, traditional caching optimizations, such as associativity and banking, are employed to reduce area requirements, miss rate, and miss penalty. The basic design is two-way set associative, and each way is banked by four, to increase read/write port availability. Given three operand queues 180a, 180b, and 180c, and a tracker board 182 for each of four banks 184a, 184b, 184c, and 184d, the entire design requires 32 small static random access memories (SRAMs) (four tables, two sets/table, four banks/set, as shown in FIG. 15, bottom of each tracker board), each of which contains two matching table entries. SRAMs for the first two operands are 64 bits wide. The third operand is used only for single-bit operands (control bits), so its SRAMS are one bit. Tracker board SRAMs are 76 bits.

The figure shows the data paths between the SRAMs in detail. Operand messages 186 from INPUT arrive at the top. Data values 188 flow down to the operand arrays, while tag information 190 travels to the tracker board. A comparator 192a, 192b, 192c, and 192d for corresponding banks determines whether a line has previously been allocated to an operand; the hash value, operand select, and tracker board pick the line, bank and "way" where the operands should reside. Bank conflicts in the matching table are handled by rejecting the input.

RTL synthesis of MATCH shows that, in isolation, MATCH hardware consumes 0.1 mm$^2$, 29.8% of total PE area, and achieves a clock cycle of 20.3 FO4. Doubling the input queue size gives a near linear increase in area (0.17 mm$^2$ or 39% of the PE)—a 20% increase in overall PE size, and 5% increase in delay. MATCH and DISPATCH are the longest stages in the PE, so increases in queue size should be considered with care.

Dispatch

The DISPATCH stage, and a fire control unit (FCU) 194 (shown in FIGS. 15 and 16) are in charge of scheduling instructions for execution. In the simplest dispatching case, the FCU removes the first entry from scheduling queues 196 (FIG. 16), reads the corresponding line from matching table 164, and passes the operands to EXECUTE for execution. This behavior is sufficient for correct execution, but does not allow dependent instructions to execute on consecutive clock cycles.

To achieve back-to-back execution of dependent instructions, bypassing paths are provided that send results from the end of EXECUTE directly back to the beginning of EXECUTE. In addition, the FCU can speculatively issue a consumer of the result, readying it to use the newly produced result on the next cycle. In particular, when the FCU selects an entry from the scheduling queue, it accesses the instruction store to determine which, if any, of the instruction's consumers reside at the same PE. If there is a local consumer, the FCU computes the index of its line in the matching table and inserts it into a special scheduling queue, called a speculative fire queue 198.

Placing a consumer instruction in the speculative fire queue is a speculative act because the FCU cannot tell whether the producer's result will allow it to fire (i.e., whether the instruction's other operands already reside in the matching table). In the example in FIG. 14, although the FCU knows that A will produce operand B[1], it does not know if B's second input, B[0], is present in the matching table. Operand availability is resolved in EXECUTE, where the speculative instruction's tag from the matching table (the unknown operand, sent to EXECUTE when the consumer is dispatched) is compared to the tag of the producer's result (the known operand, just computed). If they match, and if the presence bits match the required operand signature bits, the consumer instruction executes successfully, and the matching table entry is cleared. If not, then the result is squashed, and the matching cache entry is left unchanged.

DISPATCH gives higher priority to keeping a PE busy than dispatching dependent instructions back-to-back. Therefore, it will usually choose to execute nonspeculative instructions over speculative. In particular, if there are enough nonspeculative instructions in the scheduling queue to allow a producer's result to flow from OUTPUT back to MATCH (where it will be placed in the matching table and the match table logic will determine whether the consumer should fire), DISPATCH will choose the nonspeculative instructions. Otherwise, it will gamble that all the consumer's operands have arrived and dispatch it.

The scheduling queue size is 16 entries, chosen to be equivalent to the matching table, thus simplifying the design. The speculatively scheduled queue slot is maintained in a separate register.

The final piece of the FCU is an Instruction Control Unit (ICU) 200 (FIG. 16), which contains the PE's decoded static instructions, their opcodes, the consumers of their results, and immediate values. The ICU in the RTL design holds 64 decoded static instructions, each 59 bits. Decreasing the number of instructions to 32 impacts performance by 23% on average; doubling it to 128 increases performance by only 3%, but also increases ICU area by 120% and PE area by 55% and cycle time by 4%. Nevertheless, these results indicate that designers of small WaveCaches' (one or a small number of clusters) should choose the larger design.

DISPATCH shares a large portion of its logic with MATCH. The separate hardware includes the ICU, the scheduling queue, and the control logic. These added components require 0.17 mm$^2$ (49% of the PE area), nearly all of which is in the ICU. DISPATCH has the same delay as MATCH (20.3 FO4).

Execute

FIG. 17 illustrates exemplary functional components 208 for EXECUTE. These components include 3:1 multiplexers 210 and 212, an arithmetic logic unit (ALU) 214, and an instruction control unit 216. EXECUTE handles three different execution scenarios: (1) the usual case is that all operands are available and the output queue can accept a result; the instruction is executed; the result written to the output queue; and the line in the matching table is unpinned and invalidated; (2) a speculative instruction, some of whose inputs are missing, was dispatched; in this case, the result is squashed, and the matching table line is unpinned but not invalidated; (3) no space exists in the output queue, and in this case, EXECUTE stalls until space is available.

In addition to a conventional functional unit, EXECUTE contains a tag-manipulation unit (not separately shown) that implements WaveScalar's tag manipulation instructions and logic for handling its data steering instructions. PEs are non-uniform. In a current exemplary design, six PEs compute integer instructions only. These require 0.02 mm$^2$ (5.7% of the PE). Two PEs per domain contain a floating point unit (FPU) in addition to the integer core. These FPU-enabled PEs require an additional 0.12 mm$^2$.

Output

OUTPUT sends a result from the ALU to the consumer instructions that require it. FIG. 18 shows functional components 220 in one exemplary design for OUTPUT. OUTPUT contains a four-entry output queue 222 that is connected directly to the PE's output buffer. Also included are a reject buffer 224, a reject message modifier 226, and a local router 228. Values can enter the output queue either from EXECUTE or from the reject buffer (explained below). If the output queue is empty, incoming values go directly to an output buffer 230. The precise size of the output queue has little effect on performance—four entries are sufficient. The reason it tends not to influence performance is that result values normally flow uninterrupted to their destination PEs. The output buffer broadcasts the value on the PE's broadcast bus. In the common case, the consumer PE within that domain accepts the value immediately. It is possible, however, that the consumer cannot handle the value that cycle and will reject it. ACK/NACK signals require four cycles for the round trip. Rather than have the data value occupy the output buffer for that period, the PE assumes it will be accepted, moving it into the four-entry reject buffer, and inserts a new value into the output buffer on the next cycle. If an operand ends up being rejected, it is fed back into the output queue to be sent again to the destinations that rejected it. If all the receivers accept the message, the reject buffer discards the value. When rejected messages are going from the reject buffer to the output queue, any message from the execution unit bypasses the output queue to avoid queuing two messages on the same cycle, as described in detail below.

Each instruction has its consumer instruction locations stored in the instruction cache. The destinations can either be to memory, or to up to two other PEs. Each destination has a valid bit that is cleared whenever the destination PE accepts the message, which can happen either through the standard output network, or when PEs in the same pod successfully execute a speculatively scheduled instruction. The output queue stops sending the message when all destination bits are clear.

Since there is no determined length of time that an entry can sit in the matching cache, there must be a mechanism for preventing messages from cycling through the reject buffer enough times to affect the sender's performance. To handle this condition, the sender keeps a two-bit counter of the number of times that the message has been rejected. When this counter reaches its maximum value, the sender requests that the receiver forcefully accept the message. When the receiver gets a forced accept request, it rejects the message, but places the entry that is blocking the message into the scheduling queue to fire. Instead of firing normally, the entry is sent through the pipeline without modifications to its tag or data. This entry will then travel through the pipeline in the standard manner, but instead of going to its destination, it goes to the memory pseudo-PE with a special flag to indicate that the message should be sent back later. The memory pseudo-PE holds a table of entries that have been sent to the L1 cache that need to be resent to the domain, and retrieves those entries later. In the special case that two operands are stalled, then the fire control unit will send each operand in a separate message. This mechanism requires very little extra logic to implement, and guarantees that each message will eventually make it to the receiver.

The output stage consumes 9% of the PE's area. It achieves a clock rate of 17 FO4 in isolation, and the remainder of its clock cycle is devoted to wire delay in the intra-domain interconnect.

PE Area and Timing

In total, each PE consumes 0.36 mm$^2$, and all together, comprise 87% of total chip area. The matching table stage in the PE is the critical path (20.3 FO4) for both the PE and the domain. Within MATCH, the longest path is the one that updates the scheduling queue. This path depends on a read/compare of the matching table.

In addition to the eight PEs, each domain contains two pseudo-PEs (called MEM and NET) that serve as portals to the memory system and PEs in other domains and other clusters. Each pseudo-PE contains buffering for 64 messages. The NET and MEM pseudo-PEs are 0.08 mm$^2$ and 0.06 mm$^2$, respectively.

An entire domain occupies 3.6 mm$^2$. In order to estimate the area of the domain exclusive of its intra-domain interconnect (described in the next section), the PEs were synthesized in isolation and the areas was compared to the total domain area after processing with Cadence Encounter™. Using this estimate, it was found that the domain interconnect was 8.6% of the total domain size.

The Network

The preceding section describes the execution resource of the WaveCache, i.e., the PE. This section provides details about how PEs on the same chip communicate. PEs send and receive data using a hierarchical on-chip interconnect system 240, which is shown in FIG. 19. There are four levels in this hierarchy: intra-pod 242, intra-domain 244, intra-cluster 246, and inter-cluster. The first three of these networks are illustrated in FIG. 19, which depicts exemplary details of a single cluster 52 (shown in FIG. 2). The fourth network, the inter-cluster network, is a dynamically routed packet network that connects the clusters using a switch 248. While the purpose of each network is the same—transmission of instruction operands and memory values—the design varies significantly across them. Salient features of these networks are described below in the next four sections.

PEs in A Pod

The first level of interconnect, intra-pod interconnect 242, enables two PEs 64 to share their bypass networks and scheduling information. Merging a pair of PEs into a pod 65 provides lower latency communication between them than using intra-domain interconnect 244 (see below).

While PEs in a pod snoop each other's bypass networks, all other aspects of a PE remain partitioned—separate matching tables, scheduling and output queues, etc. The intra-pod network transmits data from the execution units, and transmits instruction scheduling information from the Fire Control Units.

Currently, the exemplary RTL model is implemented with two PEs per pod. The simulations show that this design is 5% faster on average than PEs in isolation and up to 15% faster for vpr and ammp. Increasing the number of PEs in each pod would further increase IPC, but since DISPATCH is already the longest stage in the PE, it would have a detrimental effect on cycle time.

The Intra-Domain Interconnect

PEs communicate over intra-domain interconnect 244, shown in detail in FIG. 20. Its interface to both PEs and pseudo-PEs is identical. The intra-domain interconnect is broadcast-based. Each of the eight PEs has a dedicated 164-bit result bus that carries a single data result to the other PEs in its domain. Each pseudo-PE also has a dedicated 164-bit output bus. PEs and pseudo-PEs communicate over the intra-domain network using a garden variety ACK/NACK network. The timing of this network in this design is illustrated with an exemplary timing diagram 250 shown in FIG. 21. In this example PE0 is trying to send D0 to PE1 and PE2, and D1 to PE1.

Cycle 0: PE0 sends D0 to PE1 and PE2. The OUTPUT stage at PE0 prepares the message and broadcasts it, asserting the PE1 and PE2 receive lines.

Cycle 1: PE0 sends D1 to PE1, which reasserts its receive line. At PE1 and PE2, INPUT processes D0 and sends it to MATCH.

Cycle 2: PE0 goes idle. INPUT at PE1 receives D1 and sends it to MATCH. MATCH of PE2 detects a matching table conflict for D0 and asserts the NACK signal. PE1 does not have a conflict and, by not asserting NACK, accepts the message.

Cycle 3: The interconnect delay.

Cycle 4: PE0 receives the NACK signal from PE2 for D0.

Cycle 5: PE0 notes that PE1 accepted D1 and attempts to retry sending D0 to PE1.

There are two advantages of using ACK/NACK flow control for this network. The first is a large reduction in area. There are ten inputs 252 to each PE, and adding a two-entry buffer to each input would require 2868 bits of buffering at each receiver. Instead, only 169 bits of buffering are used at the sender in this exemplary design. Second, ACK/NACK flow control allows messages to bypass the rejected messages. The consequences of these advantages are a lower clock rate and sustained bandwidth.

The downside, however, is that rejected messages take far longer to process. In our experiments, we found that on average fewer than 1% of messages were rejected. As there is only one ALU per PE, provisioning the network to send more than one result per cycle is useful only for processing these relatively few rejected messages. Widening the PE broadcast busses to transmit two results increased performance negligibly and significantly increased the complexity of the PEs' input and output interfaces.

The Intra-Cluster Interconnect

The intra-cluster interconnect provides communication between the four domains' NET pseudo-PEs. It also uses an ACK/NACK network similar to that of the intra-domain interconnect, with some additional buffering. An extra pipeline stage is added to the network to account for wire delay. The pseudo-PEs occupy only 8% of the domain area. Synthesized in isolation, they pass timing at 20 FO4, with considerable slack to spare (i.e., they can be clocked faster).

The Inter-Cluster Interconnect

The inter-cluster interconnect is responsible for all long-distance communication in the WaveCache, which includes operands traveling between PEs in distant clusters and coherence traffic for the L1 caches.

Each cluster contains an inter-cluster network switch, each of which routes messages between 6 input/output ports. Four of the ports lead to the network switches in the four cardinal directions, one is shared among the four domains' NET pseudo-PEs, and one is dedicated to the store buffer and L1 data cache.

The inter-cluster interconnect uses a simple dynamic routing switch. Each switch has six input/output ports, each of which supports the transmission of up to two operands. Its routing follows a simple protocol: the current buffer storage state at each switch is sent to the adjacent switches, which receive this information a clock cycle later. Adjacent switches only send information if the receiver is guaranteed to have space.

The inter-cluster switch provides two virtual channels that the interconnect uses to prevent deadlock. FIG. 22 shows the details of one input/output port 260 of the inter-cluster switch. Input/output port 260 includes an input arbiter 262, which controls an input select multiplexer 264 and a reject control 266. A selected input is applied to a demultiplexer 270. A channel select 268 controls demultiplexer 270 and also a multiplexer 272, which determines the output of a 274 that is input to reject control 266. A channel arbiter 276 controls a multiplexer 278 to control the output from queue 274 that is applied to a South block 280. The output of South block 280 is provided as an input to the ports via a data line 282 and to a routing block 284. Each output port thus includes two 8-entry output queues (one for each virtual network). In some cases, a message may have two possible destinations (i.e., North and West if its ultimate destination is to the northwest). In these cases routing block 284 randomly selects which way to route the message.

The network carries messages that are 164 bits wide and include a destination location in the grid. In each message, 64 bits are used for data, and 64 bits for tag; the additional bits are for routing. The destination routing includes the following elements: destination cluster x and y (four bits each), destination domain (two bits), destination PE (three bits), destination virtual slot number (six bits), and destination operand number (two bits). Memory messages are also routed over this network, and share routing bits with those used for sending operands. Memory messages are routed with the cluster position, sequence tag information (15 bits) and store buffer number (two bits).

In the TSMC process there are nine metal layers available, which means the long distance inter-cluster wires sit above the main cluster logic, minimizing the area impact of the switches. Each cluster switch requires 0.34 mm$^2$ and achieves a clock cycle of 19.9 FO4. In aggregate, the network switches account for 2% of the entire die.

Network Traffic

One goal of the WaveCache interconnect is to isolate as much traffic as possible in the lower layers of the hierarchy (e.g., within a PE, a pod, or a domain), and rely on the upper levels only when absolutely necessary. FIG. 23 illustrates a graph 290 that shows the division of traffic among different layers of the hierarchy. On average, 28% of network traffic travels from a PE to itself or the other PE in its pod, 48% of traffic remains within a domain, and only 2.2% needs to traverse the inter-cluster interconnect. Fine-grain applications require more inter-cluster traffic (33% of operands), which reflects the increased synchronization overhead required for fine-grain threading.

The graph also shows the division between operand data and memory/coherence traffic. Memory traffic accounts for 12% of messages on average. For the Spec2000 applications, less than 1% of those messages leave the cluster, because the instruction working set for each of these applications fits within a single cluster. Data sharing in the Splash-2 benchmarks increases inter-cluster memory traffic to 17% of memory traffic, but still only 0.4% of total network traffic—everything else is local.

These results demonstrate the scalability of communication performance on the WaveCache. Applications that require only a small patch of the WaveCache, such as Spec, can execute without ever paying the price for long distance communication.

Waves and Wave-Ordered Memory

The hardware support for wave-ordered memory lies in the WaveCache's store buffers. Waves and wave-ordered memory enable WaveScalar to execute programs written in imperative languages, such as C, C++, or Java, by providing the well-ordered memory semantics these languages require. The hardware support for wave-ordered memory lies in the WaveCache's store buffers. WaveScalar is a tagged token dataflow machine. It supports execution of applications written in mainstream imperative languages through the use of a special memory interface, wave-ordered memory. The key difference in implementing the hardware for this interface, as compared to a conventional store buffer or load/store queue, is the order in which memory operations fire. Instead of being sequenced by an instruction fetch mechanism, it is under direct program control. A brief review is provided at this point, in order to provide context for the microarchitectural design.

When compiling a WaveScalar program, a compiler breaks its control flow graph into pieces called waves. The key properties of a wave are: (1) its instructions are partially ordered (i.e., it contains no back-edges); and, (2) the control enters at a single point. The compiler uses the control flow graph and the instruction order within basic blocks to annotate each memory operation with (1) its position in its wave, called a sequence number, and (2) its execution order (predecessor and successor) relative to other memory operations in the same wave, if they are known. Otherwise, they are labeled with '?'.

During program execution, the memory system (in this exemplary implementation, a store buffer) uses these annotations to assemble a wave's loads and stores in the correct order. FIG. 1, which was discussed above, shows how the wave-ordering annotations enable the store buffer to order memory operations and detect those that are missing.

Store Buffers

The store buffers, one per cluster, are responsible for implementing the wave-ordered memory interface that guarantees correct memory ordering. To access memory, processing elements send requests to their local store buffer via the MEM pseudo-PE in their domain. The store buffer will either process the request or direct it to another buffer via the inter-cluster interconnect. All memory requests for a single dynamic instance of a wave (for example, an iteration of an inner loop), including requests from both local and remote processing elements, are managed by the same store buffer.

To simplify the description of the store buffer's operation, R.pred, R.seq, and R.succ are denoted as the wave-ordering annotations for a request R. Also, next(R) is defined to be the sequence number of the operation that actually follows R in the current instance of the wave. The next(R) is determined either directly from R.succ or is calculated by the wave-ordering memory, if R.succ is '?'.

The store buffer contains four major microarchitectural components: an ordering table, a next table, an issued register, and a collection of partial store queues. Store buffer requests are processed in three pipeline stages: MEMORY-INPUT writes newly arrived requests into the ordering and next tables. MEMORY-SCHEDULE reads up to four requests from the ordering table and checks to see if they are ready to issue. MEMORY-OUTPUT dispatches memory operations that can fire to the cache or to a partial store queue (described below). Each pipeline stage of this memory interface is described in detail below.

MEMORY-INPUT accepts up to four new memory requests per cycle. For each memory request, it writes its address, operation, and datum (if available, for stores) into the ordering table at the index R.seq. If R.succ is defined (i.e., is not '?'), the entry in the next table at location R.seq is updated to R.succ. If R.prev is defined, the entry in the next table at location R.prev is set to R.seq.

MEMORY-SCHEDULE maintains the issued register, which points to the next memory operation to be dispatched to the data cache. It uses this register to read four entries from the next and ordering tables. If any memory ordering links can be formed i.e., next table entries are not empty, the memory operations are dispatched to MEMORY-OUTPUT and the issued register is advanced. The store buffer supports the decoupling of store-data from store-addresses, which is done with a hardware structure called a partial store queue, as described below. The salient point for MEMORY-SCHEDULE, however, is that stores are sent to MEMORY-OUTPUT even if their data have not yet arrived.

MEMORY-OUTPUT reads and processes dispatched memory operations. Four situations can occur: (1) the operation is a load or a store with its datum and is sent to the data cache; (2) the operation is a load or a store and a partial store queue exists for its address; the memory operation is sent to the partial store queue; (3) the memory operation is a store, its datum has not yet arrived, and no partial store queue exists for its address; in this case, a free partial store queue is allocated and the store is sent to it; and, (4) the operation is a load or a store, but no free partial store queue is available or the partial store queue is full; the operation is discarded and the issued register is rolled back.

FIG. 24 illustrates exemplary store buffer logic and structures 300 that are needed to order a single wave of memory requests. An ordering table 302 has 32 entries received from an input arbitration block 304; each is composed of four banks that are interleaved to allow four consecutive entries to be read or written each cycle. The ordering table is 130 bits wide, large enough to hold an address and the memory request opcode. A next request table 306 has 32 entries and is five bits wide and tracks next( ) information for the wave.

In this exemplary design, each store buffer contains two partial store queues 308a and 308b, each of which can hold four memory requests. Each partial store queue has one read port 310 and one write port 312. In addition, a two-entry associative table 314 detects whether an issued memory operation should be written to one of the partial store queues or be sent to data cache 316. Doubling the number of partial store queues increases performance by only 9% on average, while halving the number reduces it by 5%.

Each store buffer requires 0.6 $mm^2$ to implement. Four of these store buffers occupy 2.4 $mm^2$ per cluster. Of this, the partial store queues occupy 0.02 $mm^2$. This design achieves a clock speed of 25 FO4. It is the slowest of any component in the design and sets the clock rate for the device.

Caching and Coherence

The rest of the WaveCache's memory hierarchy comprises a 32 KB, four-way set associative L1 data cache at each cluster, and a 16 MB L2 cache distributed along the edge of the chip (16 banks in a 4×4 WaveCache). A directory-based multiple reader, single writer coherence protocol keeps the L1 caches consistent. All coherence traffic travels over the inter-cluster interconnect.

Larger and smaller size caches have been explored. The data are largely commensurate with what one observes in traditional microprocessors; a larger cache helps performance. The baseline design, with 32 KB of cache requires 0.4 $mm^2$ per cluster to implement. It is contemplated that hardware designers will choose an appropriate cache size, depending upon their application mix and area constraints, as they do with all processors.

The L1 data cache has a three-cycle hit delay (two cycles SRAM access, one cycle processing), which can be overlapped with the store buffer processing for loads. The L2's hit delay is 14-30 cycles depending upon address and distance to a requesting cluster. Main memory latency is modeled at 1000 cycles. In the exemplary RTL model, the L1 caches occupy 4% of the cluster's area. It is assumed that the L2 is off-chip. Doubling the size of the L1 data caches improves performance by only 3%. Additional cycle delays of larger caches begin to appear only at the 128 K (one additional cycle), and 256 K (two additional cycles) sizes. Shrinking the data cache to 16 K has negligible effect on access time.

Scaling the WaveCache

The previous three sections described the microarchitectural implementation of the WaveCache. The exemplary RTL was tuned and built around the "baseline" WaveCache above. That design requires 252 $mm^2$ in a 90 nm process. As with all processors, however, its core memory sizes and bandwidths can be tuned for different market segments. Two ends of the design space are briefly described. The performance and configuration of these alternatives are depicted in a bar graph 320 in FIG. 25. For each WaveCache size, the application was run with the optimal number of threads for that number of clusters.

At the low end is a 18 $mm^2$ single-cluster WaveCache. The results show that this small WaveCache achieves essentially the same performance on single-threaded C applications as the full-size WaveCache. Obviously, it does not perform as well on parallel applications, such as Splash-2, because there are fewer execution resources available and, therefore, insufficient room to support multiple concurrent threads.

At the high end, a large 8×8 grid of clusters is possible for future WaveCaches. Such a design does not fit in 90 nm technology, but becomes practical at the 45 nm technology node, where it is estimated that it is roughly 250 $mm^2$. This design does little for single-threaded C applications, but increases Splash-2 performance by 2.8 times and fine-grained dataflow kernel performance by a factor of two relative to the 4×4 baseline configuration.

Flowcharts Illustrating Exemplary Logical Steps

Several flowcharts illustrate exemplary logical steps that are implemented when carrying out the techniques described above. FIG. 26 illustrates a flowchart 330 showing steps employed in processing a memory operation, when both ordered and unordered memory operations can be employed. This process starts with receipt of a memory operation in a block 332. A decision step 334 then determines if the memory operation is wave ordered, and if not, a step 336 performs or executes the memory operation without regard to any ordering routes. Conversely, if the memory operation is ordered, a decision step 338 determines if the memory operation is a memory fence. If not, a step 340 performs the memory operation in accordance with the wave-ordering rules, as explained above. However, if the memory operation is a memory fence, a step 342 waits for all prior ordered memory operations to complete, according to the wave-ordering rules. Then, a step 344 sends an acknowledgement token to targets of the memory fence instruction to indicate the completion of the ordered memory operations. Processing then continues.

FIG. 27 illustrates a flowchart 400 showing exemplary logical steps for combining ordered and unordered memory operations using a sequence start instruction. The process begins at a step 420 in which one or more ordered memory operations are started. Steps 422 and 424 then are implemented in parallel. In step 422, a memory sequence start operation is initiated, while in step 424, the ordered memory operations are allowed to complete. After both steps 422 and 424, a step 426 indicates that a memory sequence stop operation completes. A step 428 then executes the next unordered memory operations, followed by a step 430, which executes another memory sequence start operation. One or more ordered memory operations can then be started in a step 432.

A flowchart 450 in FIG. 28 is very similar to flowchart 400 and some of the same reference numbers have been applied to the same steps as they occur therein. After starting one or more ordered memory operations in step 420 of FIG. 28, steps 452 and 424 are carried out in parallel. In step 452, a memory fence operation is initiated, in parallel with the completion of ordered memory operations in step 424. Then, in a step 454, the memory fence operation completes, and step 428 provides for executing unordered memory operations. A step 456 again executes a memory fence operation, before step 432 starts one or more ordered memory operations.

A flowchart 500 in FIG. 29 illustrates exemplary logical steps for implementing partial store control. In this flowchart and in the following discussion, the term "partial store queue" is abbreviated as PSQ. The logic begins with receipt of a memory operation message in a block 502. A decision step 504 determines if the memory operation is a store address operation. If not, a decision block 506 determines if a PSQ is already allocated for this address (i.e., the current memory address). If not, a step 508 sends the operation to the data cache, which terminates the logic in this flowchart. However, an affirmative response leads to a decision step 510, which determines if the operation contains datum completing the store-address operation at the head address of the PSQ for this address. If so, a step 512 applies all memory operations in the PSQ, from the head to the oldest incomplete store operation. A step 514 then frees the PSQ for subsequent use.

If, in decision step 504, the operation is a store address operation, a decision step 516 also determines if the PSQ is already allocated for this address. Although decision steps 506 and 516 are identical, they lead to different logical steps, based on the results of the determination made in decision step 504. An affirmative response to decision step 516 or a negative response to decision step 510 leads to a decision step 518, which determines if the PSQ is full. If so, the logic rejects the current memory operation temporarily (until the PSQ is no longer full). A negative response to decision step 516 leads to a decision step 522, which determines if there is a free PSQ. If not, the logic also proceeds to step 520, to temporarily reject the memory operation being processed. Otherwise, the logic proceeds to a step 524, which allocates the PSQ to processing memory operations with the same address as this one (the current memory operation). A step 526 then places the memory operation in the PSQ, as discussed above.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for facilitating thread synchronization in a dataflow computing device having a plurality of dataflow processing elements, wherein the dataflow computing device does not use a program counter, each of said plurality of dataflow processing elements being autonomous and thus, capable of independently sequencing, issuing, and executing the instructions when the plurality of dataflow processing elements are employed for executing at least one thread, comprising the steps of:
   (a) dividing a control flow graph of a thread into a plurality of waves, wherein each wave comprises a connected, directed partially ordered portion of the control flow graph, with a single entrance;
   (b) providing wave number tags to be used in identifying each individual dynamic instance of data used when executing a thread, each memory operation being annotated with its location in each wave and in regard to its ordering relationship with other memory operations in the wave, to define a wave-ordered memory, the wave-ordered memory ensuring that the results of earlier memory operations are visible to later memory operations; and
   (c) including a memory fence instruction that, when executed, indicates a commitment to memory of prior load and prior store operations that have occurred during execution of a thread with which the memory fence instruction is employed.

2. The method of claim 1, wherein the memory fence instruction causes an acknowledgement to be returned, when all prior load operations and prior store operations have completed.

3. The method of claim 2, wherein the memory fence instruction is provided to a memory interface, but does not execute a load operation or a store operation.

4. The method of claim 1, wherein the memory fence instruction is executed at least one of:
   (a) before acquiring a lock on a memory object or a code section; and
   (b) before releasing a lock on a memory object or a code section.

5. The method of claim 1, wherein the memory fence instruction is included as an ordered instruction in the wave-ordered memory operations for executing the thread.

6. The method of claim 5, wherein ordered and unordered memory operations are included in the execution of the thread, and wherein the memory fence instruction is issued to synchronize the ordered and unordered memory operations.

7. The method of claim 6, wherein the memory fence instruction is issued after an ordered memory operation, and before an unordered memory operation, so that in response to the memory fence instruction, the ordered memory operation completes before the unordered memory operation executes.

8. The method of claim 6, wherein the memory fence instruction is issued after an unordered memory operation, and before an ordered memory operation, so that in response to the memory fence instruction, the unordered memory operation completes before the ordered memory operation executes.

9. The method of claim 1, wherein the memory fence instruction is executed to ensure that a wave-ordered memory operation is visible to other threads that will use a result of the wave-ordered memory operation.

10. A method for ensuring that memory operations carried out when executing a first thread are visible to a second thread that is executing on the same wave-ordered memory system in a dataflow computing device, wherein the dataflow computing device does not use a program counter, comprising the steps of:
   (a) carrying out a memory operation in connection with execution of the first thread on a wave-ordered memory system; and
   (b) issuing an acknowledgement visible to the first thread and indicating that the memory operation carried out by the first thread has been completed, the acknowledgement also triggering the first thread to execute any further instruction that is next to be executed in the thread, and triggering the second thread to access data resulting from the memory operation on the wave-ordered memory system, wherein the wave-ordered memory system is a system wherein each memory operation is annotated with its location in a wave and in regard to its ordering relationship with other memory operations in the wave, to define a wave-ordered memory, and wherein the wave comprises a connected, directed partially ordered portion of a control flow graph, with a single entrance.

11. The method of claim 10, wherein the step of issuing the acknowledgement is implemented by executing a memory fence instruction after the memory operation has been carried out.

12. The method of claim 10, wherein the memory operation is one of a load operation, and a store operation.

13. A method for use in a dataflow processing system in which a plurality of memory operations within a single thread are executed in a defined order and wherein the dataflow processing system does not use a program counter, comprising the steps of:
(a) executing a memory sequence start instruction to start a memory ordering sequence within the single thread, so that in response to the memory sequence start instruction, a new memory sequence is created, wherein the memory ordering sequence is wave-ordered, so that in a wave-ordered memory, each memory operation is annotated with its position in a wave and its execution order relative to other memory operations in the wave, each wave comprising a connected, directed partially ordered portion of a control flow graph; and
(b) executing a memory sequence stop instruction to terminate the memory ordering sequence.

14. The method of claim 13, further comprising the step of enabling unordered memory instructions that are dependent upon ordered memory instructions to be executed, after the memory sequence stop instruction has executed.

15. The method of claim 14, wherein the memory stop instruction produces a token indicating that all of a set of instructions comprising the ordered memory have completed, the token triggering the unordered memory instructions to begin executing, thereby ensuring that the unordered memory instructions do not execute until the set of memory instructions comprising the ordered memory have completed.

16. The method of claim 14, further comprising the step of creating yet another ordered memory sequence after the unordered memory instructions have completed.

17. The method of claim 16, wherein in response to a memory sequence start instruction, a new thread is created.

18. The method of claim 17, wherein the yet another ordered memory sequence has a thread identification that is the same as that of the ordered memory sequence previously executed.

19. The method of claim 13, wherein in response to a memory sequence start instruction, a new memory ordering is created.

20. The method of claim 19, wherein the new memory ordering comprises a new thread.

21. A method for use with a dataflow processing architecture that includes a plurality of dataflow processing elements employed for executing instructions of a plurality of threads, wherein the dataflow processing architecture does not use a program counter, each of said plurality of dataflow processing elements being autonomous and thus, capable of independently sequencing, issuing, and executing the instruction, the method facilitating processing of both ordered instructions and unordered instructions by the plurality of dataflow processing elements, comprising the steps of:
(a) dividing a control flow graph of at least one thread into a plurality of waves, wherein each wave comprises a connected, directed partially ordered portion of the control flow graph, with a single entrance;
(b) providing wave number tags to be used in identifying each individual dynamic instance of data used when executing the at least one thread, each memory operation being annotated with its location in the wave and in regard to its ordering relationship with other memory operations in the wave, to define a wave-ordered memory comprising the ordered memory instructions;
(c) executing at least a portion of the ordered memory instructions;
(d) providing an indication that at least the portion of the ordered instructions have completed;
(e) in response to the indication, enabling the unordered instructions to execute on at least one of the plurality of processing elements; and
(f) after the unordered instructions have executed, starting execution of another portion of the ordered instructions on at least one of the plurality of processing elements.

22. The method of claim 21, wherein the step of providing the indication that at least the portion of the ordered instructions have completed comprises the step of executing a memory sequence stop instruction that produces the indication to show that all preceding ordered memory instruction operations have completed, so that the unordered memory instructions can begin executing.

23. The method of claim 21, further comprising the step of executing a memory sequence start instruction after the unordered memory instructions have completed, the memory sequence start instruction facilitating execution of said another portion of the ordered instructions.

24. The method of claim 21, wherein the step of providing the indication that at least the portion of the ordered instructions have completed comprises the step of executing a memory fence instruction that prior loads and stores have been committed to memory and returns an acknowledgement that triggers execution of the unordered instructions.

25. The method of claim 24, further comprising the step of again executing the memory fence instruction after the unordered instructions have completed, to provide a further indication that memory operations of the unordered instructions are completed before said another portion of the ordered instructions begins executing.

* * * * *

UNITED STATES PATENT AND TRADEMARK OFFICE
CERTIFICATE OF CORRECTION

PATENT NO. : 7,490,218 B2  Page 1 of 1
APPLICATION NO. : 11/284760
DATED : February 10, 2009
INVENTOR(S) : Eggers et al.

It is certified that error appears in the above-identified patent and that said Letters Patent is hereby corrected as shown below:

Column 1, line 16    PLEASE DELETE "This invention was funded at least in part with grants (No. CCR03-25635 and No. CCF01-33188) from the National Science Foundation, and the U.S. government may have certain rights in this invention."
AND INSTEAD INSERT --This invention was made with U.S. Government support under grant No. CCR03-25635 and No. CCF01-33188 awarded by the National Science Foundation. The U.S. Government has certain rights in the invention.--

Column 17, line 4    "to" (1st occurrence) should read --$t_0$--

Column 31, line 10    "areas" should read --area--

Column 32, line 67    after "a" insert --queue--

Signed and Sealed this

Seventh Day of April, 2009

JOHN DOLL
*Acting Director of the United States Patent and Trademark Office*